(12) United States Patent
Totsuka et al.

(10) Patent No.: US 11,140,348 B2
(45) Date of Patent: Oct. 5, 2021

(54) AD CONVERSION DEVICE, IMAGING DEVICE, IMAGING SYSTEM, AND MOBILE APPARATUS

(71) Applicant: CANON KABUSHIKI KAISHA, Tokyo (JP)

(72) Inventors: Hirofumi Totsuka, Fujisawa (JP); Daisuke Yoshida, Ebina (JP); Takahiro Shirai, Isehara (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 16/530,094

(22) Filed: Aug. 2, 2019

(65) Prior Publication Data

US 2020/0059619 A1 Feb. 20, 2020

(30) Foreign Application Priority Data

Aug. 20, 2018 (JP) .............................. JP2018-153929

(51) Int. Cl.
*H04N 5/228* (2006.01)
*H04N 5/378* (2011.01)
*H04N 5/376* (2011.01)

(52) U.S. Cl.
CPC .............. *H04N 5/378* (2013.01); *H04N 5/376* (2013.01)

(58) Field of Classification Search
CPC ...... H04N 5/378; H04N 5/376; H04N 5/3742; H04N 5/379; H04N 5/37455; H04N 5/37452; H03M 1/12; H03M 1/56; H03M 1/123; H03M 1/1245; H03M 1/144; H03M 1/466; H03M 1/785; H01L 27/14609

See application file for complete search history.

(56) References Cited

U.S. PATENT DOCUMENTS

| | | | |
|---|---|---|---|
| 6,958,655 B2 | 10/2005 | Shirai | |
| 7,952,409 B2 | 5/2011 | Yoshida | |
| 8,237,480 B2 | 8/2012 | Yoshida | |
| 9,369,649 B2 | 6/2016 | Kobayashi | |
| 9,525,836 B2 | 12/2016 | Hashimoto | |
| 2015/0146063 A1* | 5/2015 | Nishizawa | H04N 5/378 348/302 |
| 2015/0244963 A1* | 8/2015 | Totsuka | H04N 5/378 348/308 |

(Continued)

FOREIGN PATENT DOCUMENTS

JP 2014-165733 9/2014

*Primary Examiner* — Kelly L Jerabek
(74) *Attorney, Agent, or Firm* — Venable LLP

(57) ABSTRACT

Provided is an analog-to-digital (AD) conversion device including: a comparator configured to compare an input analog signal and a reference signal; a plurality of first bit-memories configured to hold a digital signal including a plurality of bits generated based on a result of comparison performed by the comparator, each of the plurality of first bit-memories holding a bit signal of a corresponding one bit among the plurality of bits of the digital signal; an output circuit to which the bit signal output from each of the plurality of first bit-memories is commonly input; a transmission line configured to transmit the bit signal output from the output circuit; and a first scanning circuit configured to sequentially select, from the plurality of first bit-memories, a first bit-memory that outputs the bit signal to the output circuit.

20 Claims, 19 Drawing Sheets

(56) References Cited

U.S. PATENT DOCUMENTS

| | | | |
|---|---|---|---|
| 2016/0116333 A1* | 4/2016 | Kameyama | H03M 1/56 |
| | | | 250/208.1 |
| 2016/0156865 A1* | 6/2016 | Hayashi | H04N 5/3698 |
| | | | 348/302 |
| 2017/0019621 A1* | 1/2017 | Totsuka | H01L 27/14643 |

* cited by examiner

FIG. 17B
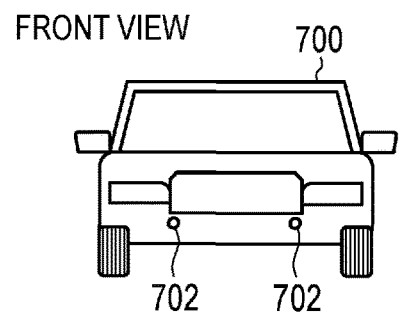
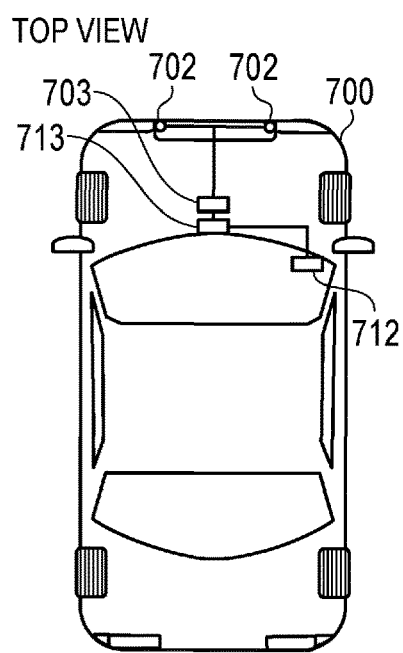
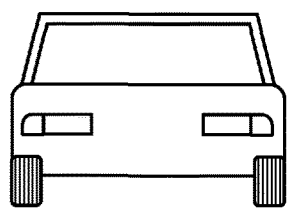

AD CONVERSION DEVICE, IMAGING DEVICE, IMAGING SYSTEM, AND MOBILE APPARATUS

BACKGROUND OF THE INVENTION

Field of the Invention

The present invention relates to an analog-to-digital (AD) conversion device, an imaging device, an imaging system, and a mobile apparatus.

Description of the Related Art

Japanese Patent Application Laid-Open No. 2014-165733 discloses an imaging device that has a plurality of AD conversion units each configured to convert a signal output from a photoelectric conversion unit into a digital signal. Such a plurality of AD conversion units are arranged over a plurality of rows and a plurality of columns.

A plurality of AD conversion units arranged on the same column are connected to a common output line. Such an output line is connected to a signal holding unit provided to the corresponding column. The signal holding units on respective columns sequentially output digital signals to an output unit of the imaging device.

Japanese Patent Application Laid-Open No. 2014-165733 does not disclose in detail a form of connection between a memory unit that holds a digital signal and a transmission line that transmits the digital signal.

SUMMARY OF THE INVENTION

The present invention intends to provide an AD conversion device, an imaging device, an imaging system, and a mobile apparatus that can increase a transmission rate of a digital signal while suppressing an increase in the number of transmission lines.

According to one aspect of the present invention, there is provided an analog-to-digital (AD) conversion device including: a comparator configured to compare an input analog signal and a reference signal; a plurality of first bit-memories configured to hold a digital signal including a plurality of bits generated based on a result of comparison performed by the comparator, each of the plurality of first bit-memories holding a bit signal of a corresponding one bit among the plurality of bits of the digital signal; an output circuit to which the bit signal output from each of the plurality of first bit-memories is commonly input; a transmission line configured to transmit the bit signal output from the output circuit; and a first scanning circuit configured to sequentially select, from the plurality of first bit-memories, a first bit-memory that outputs the bit signal to the output circuit.

According to another aspect of the present invention, there is provided an analog-to-digital (AD) conversion device including: a comparator configured to compare an input analog signal and a reference signal; a plurality of first bit-memories configured to hold a digital signal including a plurality of bits generated based on a result of comparison performed by the comparator, each of the plurality of first bit-memories holding a bit signal of a corresponding one bit among the plurality of bits of the digital signal; a transmission line configured to transmit the bit signal output from each of the plurality of first bit-memories; a first scanning circuit configured to sequentially select, from the plurality of first bit-memories, a first bit-memory which outputs the bit signal; an input circuit to which the bit signal output from each of the plurality of first bit-memories is commonly input via the transmission line; a plurality of second bit-memories configured to hold the bit signals respectively, in response to receiving the bit signals sequentially output from the input circuit; and a second scanning circuit configured to sequentially select, from the plurality of second bit-memories, a second bit-memory that receives the bit signal output from the input circuit.

Further features of the present invention will become apparent from the following description of exemplary embodiments with reference to the attached drawings.

BRIEF DESCRIPTION OF THE DRAWINGS

FIG. 17B is a view illustrating a configuration example of an imaging system and a vehicle according to the ninth embodiment.

DESCRIPTION OF THE EMBODIMENTS

Preferred embodiments of the present invention will now be described in detail in accordance with the accompanying drawings. The same or corresponding components throughout a plurality of drawings are labeled with common references, and the description thereof may be omitted or simplified.

First Embodiment

Figure 1A:
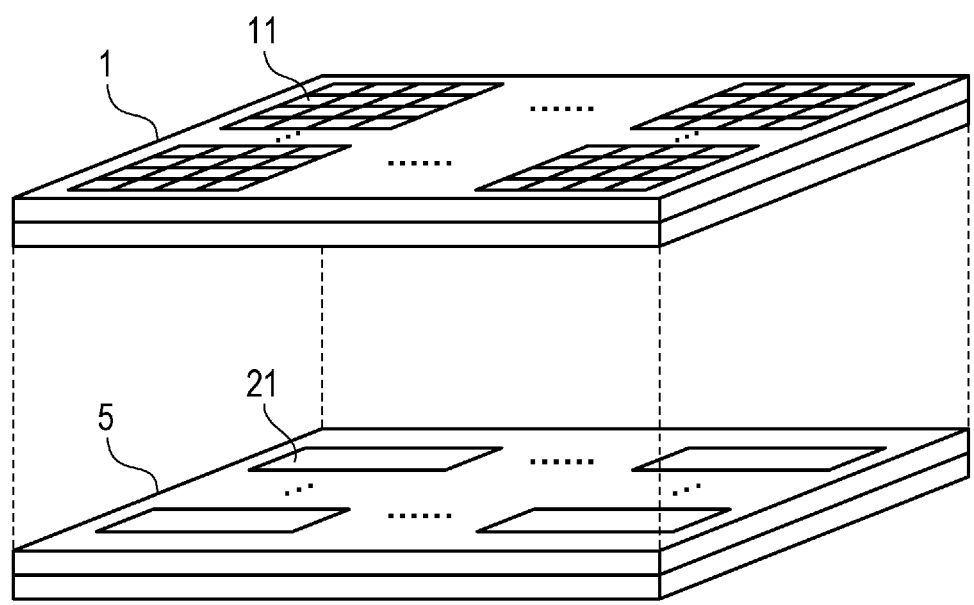
FIG. 1A is an exploded perspective view illustrating a general configuration of an imaging device according to a first embodiment.

FIG. 1A is an exploded perspective view illustrating a general configuration of an imaging device of the present embodiment. The imaging device includes a first chip 1 and a second chip 5 stacked to each other. FIG. 1A illustrates the first chip 1 and the second chip 5 as being separated vertically from each other. The first chip 1 has the pixels 11 arranged over a plurality of rows and a plurality of columns. Each of the pixels 11 includes a photoelectric conversion unit and generates an analog signal in accordance with an incident light. The second chip 5 has analog-to-digital conversion units (AD conversion units) 21 arranged over a plurality of rows and a plurality of columns. Each of the AD conversion units 21 converts an analog signal generated by the pixel 11 into a digital signal having a plurality of bits. In other words, the second chip 5 is an AD conversion device in the present embodiment.

Note that, for simplified illustration, FIG. 1A illustrates only the pixels 11 and the AD conversion units 21 as elements formed in the first chip 1 or the second chip 5. However, the imaging device may include control lines used for controlling the pixels 11 and signal lines used for transmitting output signals from the pixels 11 other than the above. Further, the imaging device may include a scanning circuit or a drive circuit such as a timing generator.

Figure 1B:
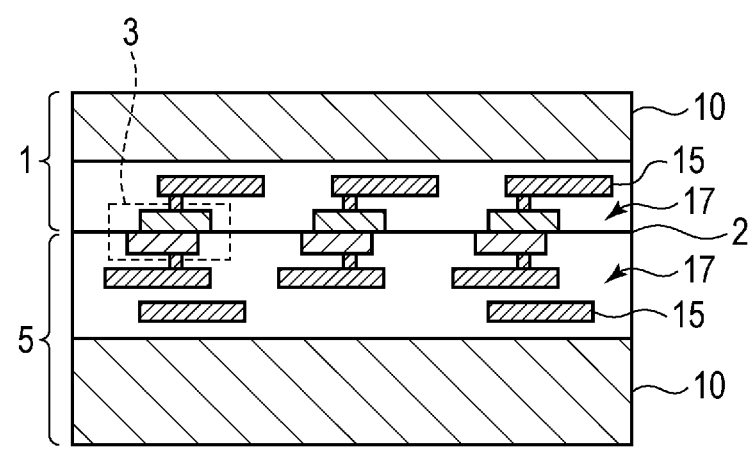
FIG. 1B is a sectional view illustrating a general configuration of an imaging device according to the first embodiment.

FIG. 1B is a sectional view illustrating a general configuration of the imaging device of the present embodiment. The first chip 1 includes a substrate 10 formed of a silicon or the like, an insulating layer 17 formed on the substrate 10, and a wiring 15 formed over a plurality of layers inside the insulating layer 17. The second chip 5 has the same structure.

The first chip 1 and the second chip 5 are joined at a junction interface 2 such that faces in which the insulating layer 17 and the wiring 15 are formed face each other. At the junction interface 2, the wiring 15 and the insulating layer 17 located in the uppermost layer of the first chip 1 are joined to be in contact with the wiring 15 and the insulating layer 17 located in the uppermost layer of the second chip 5. The material of the wiring 15 is typically copper but may be aluminum as another example. The wiring 15 located in the uppermost layer of each of the first chip 1 and the second chip 5 is connected at the connection portion 3.

Figure 2:
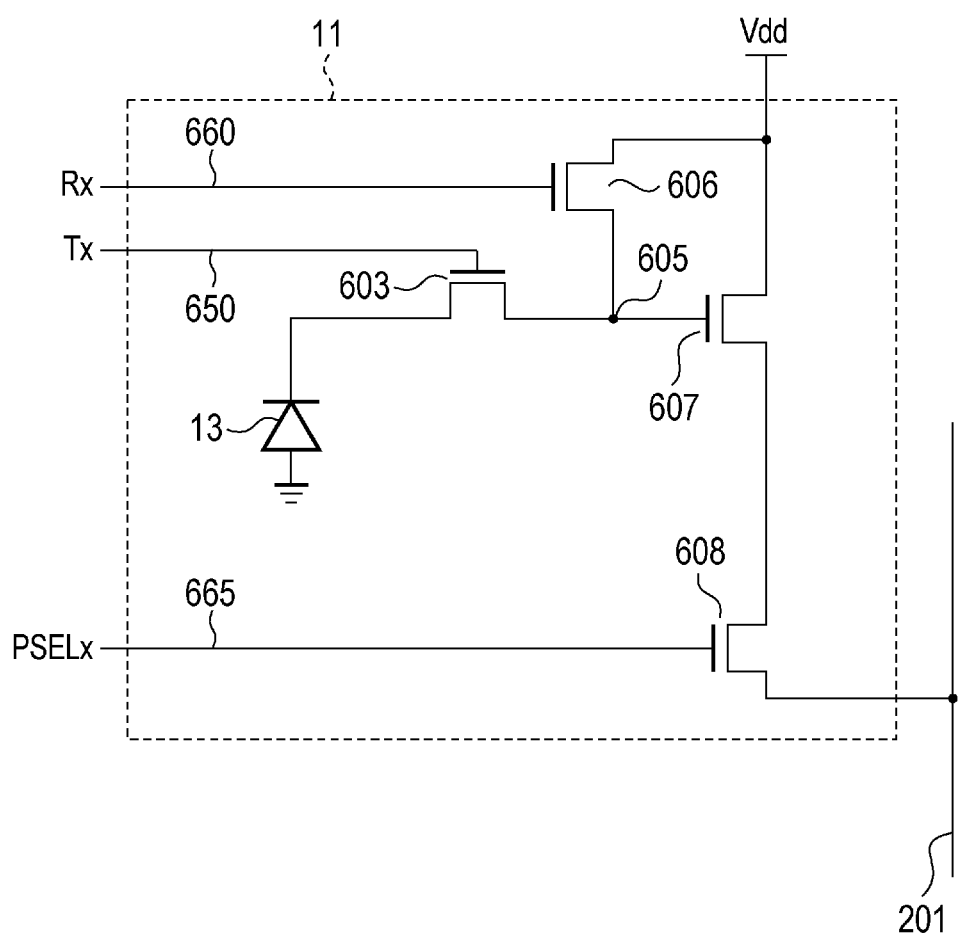
FIG. 2 is a diagram illustrating a circuit configuration of a pixel according to the first embodiment.

FIG. 2 is an equivalent circuit diagram illustrating a circuit configuration of one of the plurality of pixels 11 arranged in the first chip 1. The pixel 11 has a photoelectric conversion unit 13, a transfer transistor 603, a reset transistor 606, an amplification transistor 607, and a select transistor 608.

The photoelectric conversion unit 13 may be a photodiode. A micro-lens and a color filter (not illustrated) may be formed on a side that a light of the photodiode enters. In such a case, an incident light transmits the micro-lens and the color filter and enters the photodiode.

The photodiode of the photoelectric conversion unit 13 has an anode and a cathode. The anode is connected to a ground voltage line, and the cathode is connected to the source of the transfer transistor 603. The drain of the transfer transistor 603 is connected to the source of the reset transistor 606 and the gate of the amplification transistor 607. The node at which the drain of the transfer transistor 603, the source of the reset transistor 606, and the gate of the amplification transistor 607 are connected is a floating diffusion region (hereafter, referred to as an FD region) 605. The drain of the reset transistor 606 and the drain of the amplification transistor 607 are connected to a power source voltage line Vdd. The source of the amplification transistor 607 is connected to the drain of the select transistor 608. The source of the select transistor 608 is connected to the signal line 201.

In the first chip 1, control lines 650, 660, and 665 are arranged extending in a row direction (the horizontal direction in FIG. 2) of the pixel 11. The control lines 650, 660, and 665 supply control signals at timings common to the pixels 11 arranged on the same row. The control line 650 is connected to the gate of the transfer transistor 603. The control line 660 is connected to the gate of the reset transistor 606. The control line 665 is connected to the gate of the select transistor 608. A vertical scanning circuit (not illustrated) in FIG. 2 (a vertical scanning circuit 22 described later) supplies a control signal Tx that controls the transfer transistor 603 via the control line 650. Further, the vertical scanning circuit supplies a control signal Rx that controls the reset transistor 606 via the control line 660. Further, the vertical scanning circuit supplies a control signal PSELx that controls the select transistor 608 via the control line 665. Note that the vertical scanning circuit is arranged in the second chip 5 and may be formed of a logic circuit such as a shift register, an address decoder, or the like.

Figure 3:
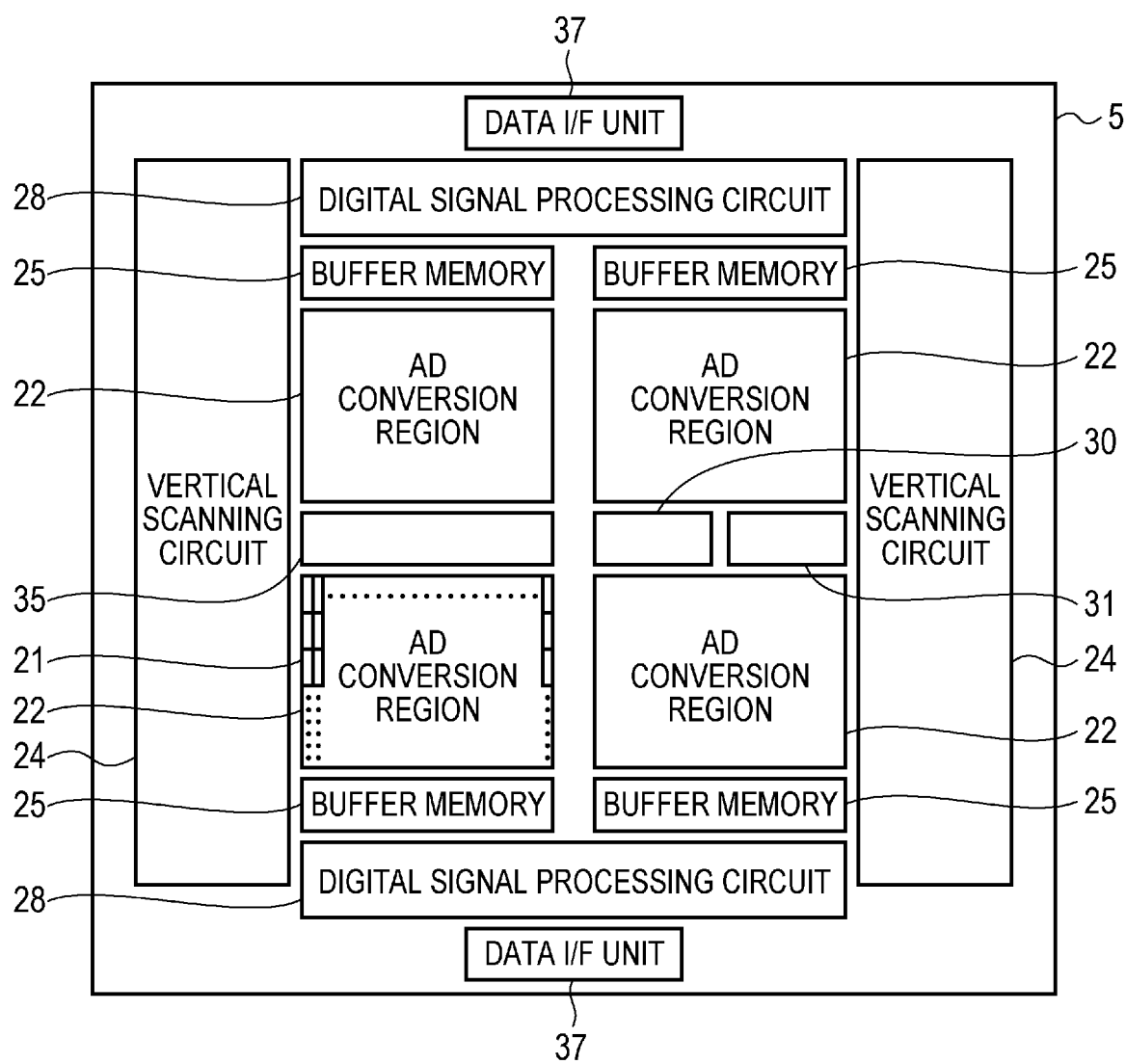
FIG. 3 is a block diagram illustrating a configuration of a second chip according to the first embodiment.

FIG. 3 is a block diagram illustrating the configuration of the second chip 5 of the present embodiment. The second chip 5 has AD conversion regions 22, vertical scanning circuits 24, buffer memories 25, digital signal processing circuits 28, a timing generator 30, a counter 31, a ramp signal generation unit 35, and data interface (I/F) units 37.

The timing generator 30 generates a control signal used for controlling operation timings or the like of respective units of the imaging device. Each of the vertical scanning circuits 24 generates a control signal used for scanning the pixels 11 arranged in the first chip 1 sequentially on a row basis. The control signals generated by the vertical scanning circuit 24 are supplied to respective transistors of the first chip 1 via the control lines 650, 660, and 665.

Each of the AD conversion regions 22 includes the plurality of AD conversion units 21 arranged over a plurality of rows and a plurality of columns. Further, as illustrated in FIG. 3, four AD conversion regions 22 are arranged over two rows by two columns in the second chip 5. Each AD conversion unit 21 converts an analog signal output from the corresponding pixel 11 via the signal line 201 into a digital signal.

In the present embodiment, AD conversion performed by the AD conversion unit 21 is of a ramp signal comparison type that compares an analog signal generated by the pixel 11 and a ramp signal that is a reference signal. The ramp signal generation unit 35 generates a ramp signal and supplies the ramp signal to the AD conversion unit 21. The counter 31 supplies a count signal whose value changes with time to the AD conversion unit 21. The count signal is a digital value of Gray code, for example. The AD conversion unit 21 performs AD conversion by storing, as a digital signal, a count value in accordance with a timing when a comparison result between the analog signal and the ramp signal changes.

Each of the buffer memories 25 is arranged in association with each of the plurality of AD conversion regions 22. The AD conversion units 21 of the AD conversion region 22 and the buffer memory 25 are connected to each other by a transmission line (not illustrated in FIG. 3). The buffer memory 25 stores a digital signal output from the AD conversion units 21 and outputs the digital signal at a predetermined timing.

The digital signal processing circuit 28 performs signal processing such as a noise subtraction process, a gain correction process, an offset correction process, or the like on a digital signal output from the buffer memory 25. The second chip 5 has two digital signal processing circuits 28. Each of the digital signal processing circuits 28 is configured to process a digital signal output from the plurality of buffer memories 25. Each data interface unit 37 is an interface that outputs data obtained by signal processing in the digital signal processing circuit 28 to a device outside the imaging device.

Figure 4A:
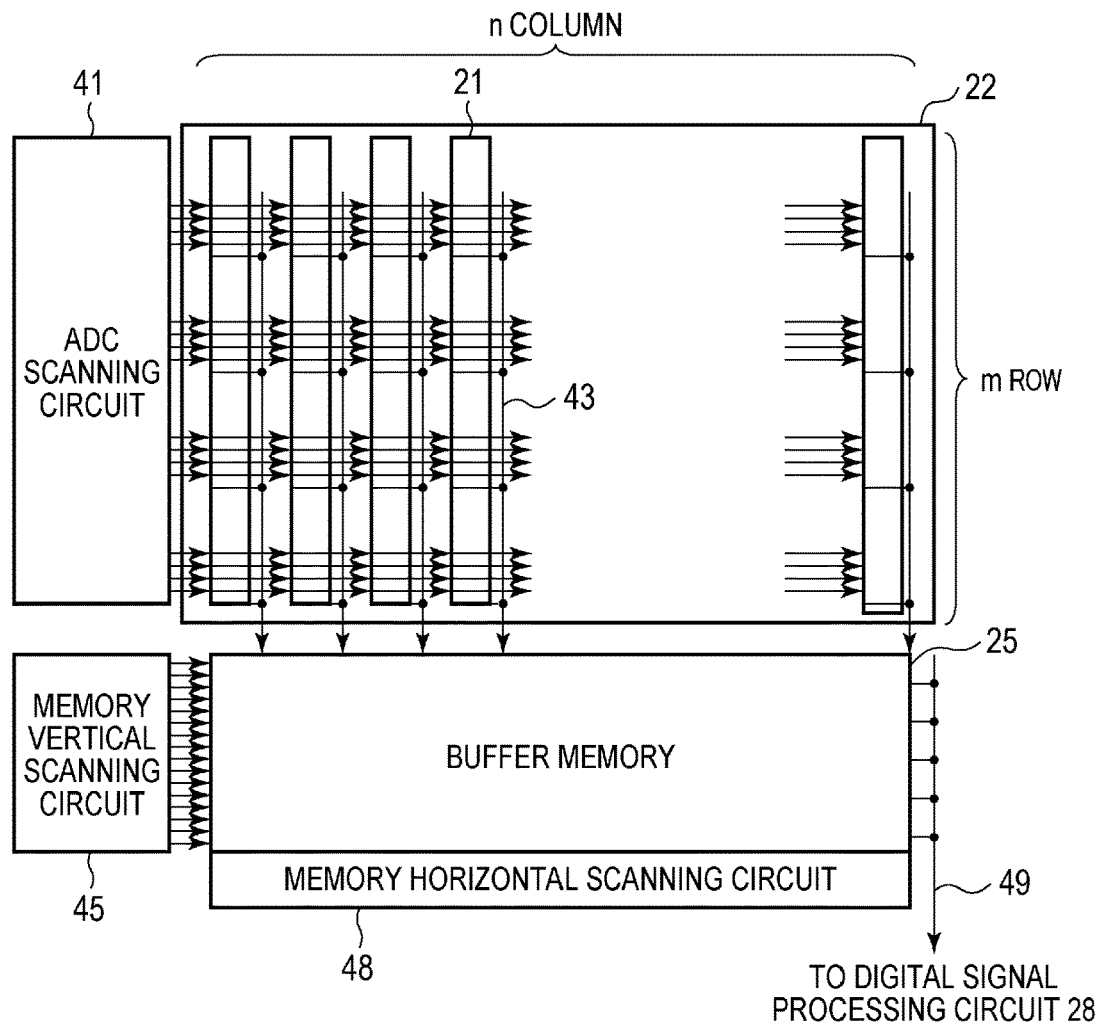
FIG. 4A is a block diagram illustrating a configuration of AD conversion units and a buffer memory according to the first embodiment.

FIG. 4A is a block diagram illustrating the AD conversion region 22 and the buffer memory 25 in more detail. In the second chip 5, in addition to those illustrated in FIG. 3, an ADC scanning circuit 41, a memory vertical scanning circuit 45, a memory horizontal scanning circuit 48, and transmission lines 43 and 49 are arranged.

As described above, the AD conversion region 22 has the AD conversion units 21 arranged over a plurality of rows and a plurality of columns. The number of rows and the number of columns as discussed above are denoted as m rows and n columns, respectively (m and n each are an integer greater than one).

The plurality of transmission lines 43 are arranged on a column basis of the AD conversion region 22. The plurality of transmission lines 43 are arranged so as to extend from the AD conversion region 22 to the buffer memory 25 provided outside the AD conversion region 22. Each of the transmission lines 43 is connected to the plurality of AD conversion units 21 on a corresponding column. That is, each of the plurality of transmission lines 43 is arranged in the AD conversion region 22 so as to be connected to the AD conversion unit 21 on a plurality of rows on a corresponding column.

Further, the ADC scanning circuit 41 scans the plurality of AD conversion units 21 on a row basis. Each of the AD conversion units 21 has a memory unit (a first memory 55 in FIG. 5 described later) that holds a digital signal obtained by AD conversion. This memory unit has a plurality of bit-memories each configured to hold a signal of one bit, which is different from other bits, of a digital signal having a plurality of bits (hereafter, denoted as a bit signal). This memory unit is connected to the transmission line 43. The ADC scanning circuit 41 selects memory units of the AD conversion units 21 on a row basis. The memory unit selected by the ADC scanning circuit 41 outputs a digital signal held by the selected memory unit to the transmission line 43.

The digital signal output to the transmission line 43 is transmitted to the buffer memory 25 via the transmission line 43. The buffer memory 25 is structured such that bit-memories that hold bit signals are arranged over a plurality of rows and a plurality of columns. The memory vertical scanning circuit 45 performs vertical scan to select a row of the buffer memory 25. Further, the memory horizontal scanning circuit 48 performs horizontal scan to select a column of the buffer memory 25.

A bit-memory arranged at a position selected by the memory vertical scanning circuit 45 and the memory horizontal scanning circuit 48 transmits a bit signal to the digital signal processing circuit 28 via the transmission line 49.

Figure 4B:
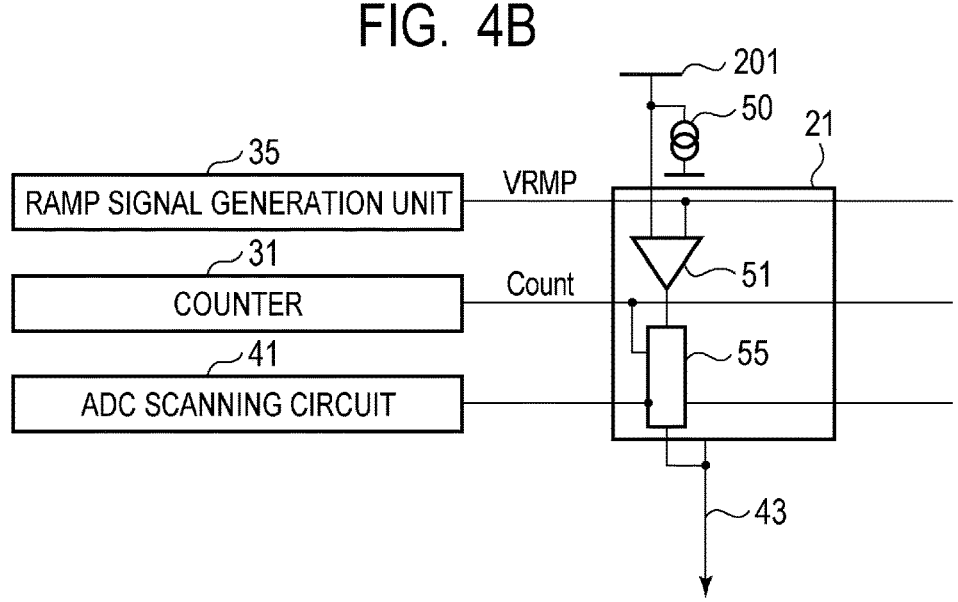
FIG. 4B is a block diagram illustrating a configuration of an AD conversion unit according to the first embodiment.

FIG. 4B is a block diagram illustrating the configuration of the AD conversion unit 21 in more detail. The AD conversion unit 21 is connected to the signal line 201 illustrated in FIG. 2 via the connection portion 3 illustrated in FIG. 1B. The current source 50 is provided in the second chip 5 and supplies a current to the signal line 201 via the connection portion 3. Thereby, the amplification transistor 607 of the pixel 11 operates as a source follower. In other words, the current source 50 and the amplification transistor 607 form a source follower circuit.

The AD conversion unit 21 has a comparator 51 and a first memory 55. An analog signal output from the pixel 11 via the signal line 201 is input to the first input terminal of the comparator 51. A ramp signal VRMP is input to the second input terminal of the comparator 51 from the ramp signal generation unit 35 illustrated in FIG. 3. The comparator 51 outputs, to the first memory 55, a comparison result signal indicating a result of comparison between an analog signal from the pixel 11 and a ramp signal VRMP.

The counter 31 outputs a count signal Count to the first memory 55. The count signal Count is a digital signal obtained by counting a clock signal with a Gray code, for example. Based on a timing when a signal level of a comparison result signal changes, the first memory 55 holds the count signal Count at this time. Here, the first memory 55 includes a plurality of bit-memories that hold a bit signal included in the count signal Count having a plurality of bits. Each bit signal of the count signal Count held by each bit-memory is each bit signal of a digital signal corresponding to a signal based on charges generated by the photoelectric conversion unit 13.

In the present embodiment, each first memory 55 is included in the corresponding AD conversion unit 21. Therefore, it can be said that the AD conversion region 22 is a region having the first memories 55 arranged over a plurality of rows and a plurality of columns.

The ADC scanning circuit 41 outputs a scan signal to the first memory 55. The first memory 55 selected in response to input of an active level scan signal outputs a held digital signal to the transmission line 43.

Figure 5:
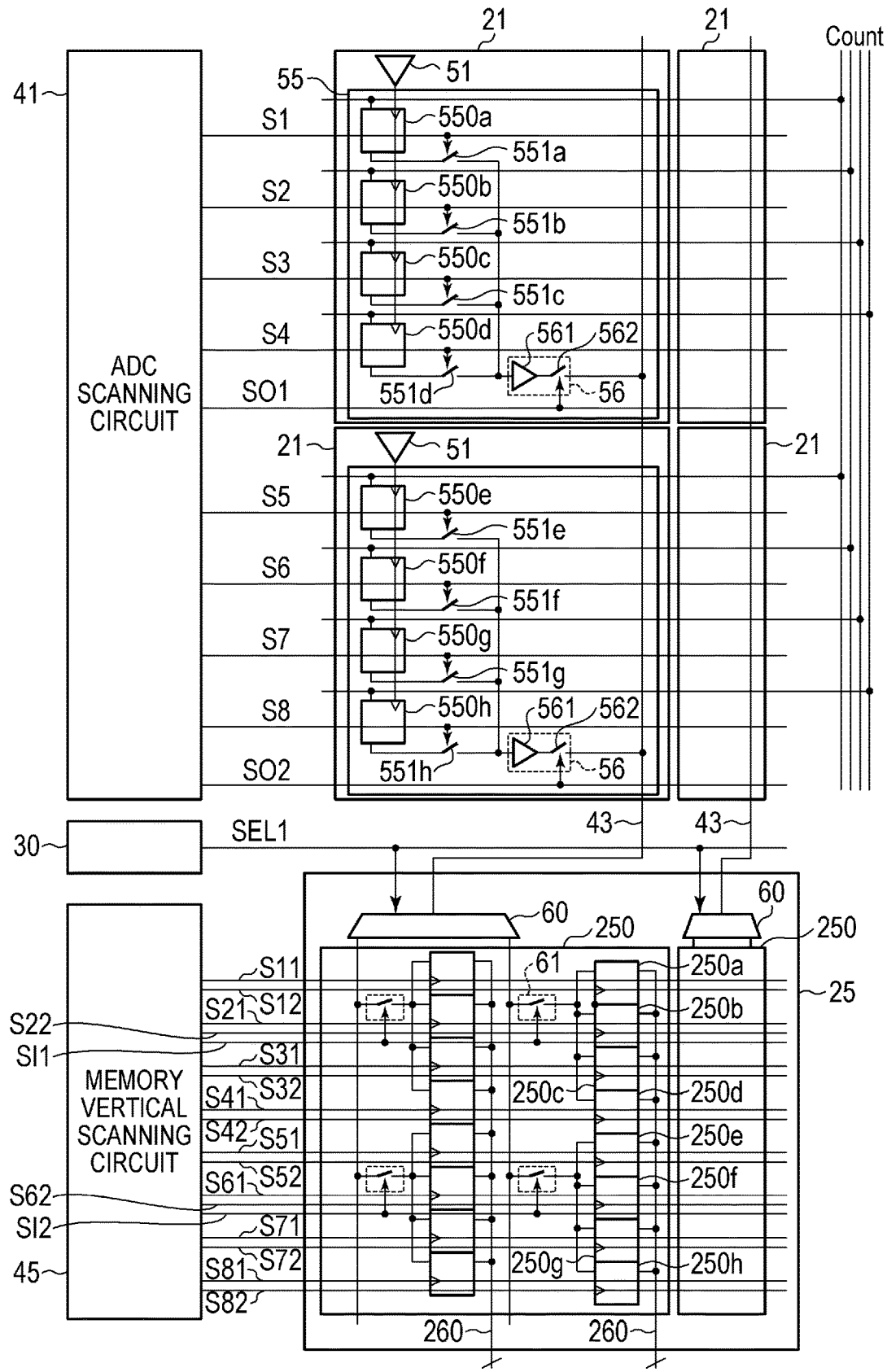
FIG. 5 is a circuit diagram illustrating in detail a configuration of the AD conversion units and the buffer memory according to the first embodiment.

FIG. 5 is a block diagram illustrating the configuration of the AD conversion unit 21 and the buffer memory 25 in more detail. In the description of FIG. 5 below, one of the AD conversion units 21 arranged over a plurality of rows and a plurality of columns is focused for illustration. Other AD conversion units 21 in the AD conversion region 22 have the same configuration.

The first memory 55 has four first bit-memories 550a to 550d, four switches 551a to 551d, and an output circuit 56. The output circuit 56 includes a buffer 561 and a switch 562.

Each of the first bit-memories 550a to 550d is input with a signal of one bit, which is different from other bits, of the count signal Count. The first bit-memories 550a to 550d hold input signals of respective bits. The output terminal of the comparator 51 is connected to the first bit-memories 550a to 550d. A comparison result signal output from the comparator 51 is output to the first bit-memories 550a to 550d.

The switch 551a is arranged between the first bit-memory 550a and the buffer 561 of the output circuit 56. Similarly, the switches 551b to 551d are arranged between the first bit-memories 550b to 550d and the buffer 561, respectively. Scan signals S1 to S4 are input to the switches 551a to 551d from the ADC scanning circuit 41, respectively. When the scan signals S1 to S4 are at the active level, the switches 551a to 551d are in a conduction state (turned on), respectively.

The switch 562 is arranged between the buffer 561 and the transmission line 43. The switch 562 is input with a scan signal SO1 from the ADC scanning circuit 41. When the scan signal SO1 is at the active level, the switch 562 is in a conduction state (turned on).

The ADC scanning circuit 41 is a first scanning circuit that scans the first bit-memories 550a to 550d in a first direction (which is a downward direction in FIG. 5 and a direction in which the row number increases) by sequentially turning on the switches 551a to 551d. That is, the ADC scanning circuit 41 performs a scan to sequentially select the first bit-memories 550a to 550d connected to the output circuit 56. Further, each of the transmission lines 43 is connected to the four first bit-memories 550a to 550d via the switches 551a to 551d and the output circuit 56. That is, the transmission line 43 is a first transmission line to which a plurality of first bit-memories are connected via the output circuit 56.

The ADC scanning circuit 41 sequentially controls the scan signals S1 to S4 to the active level. Further, the ADC scanning circuit 41 controls the scan signal SO1 to the active level in a period in which the scan signals S1 to S4 are controlled to the active level. Thereby, bit signals are sequentially output from the first bit-memory 550a to the transmission line 43 via the output circuit 56. Thereby, the transmission line 43 serially transmits respective bit signals of a digital signal output from one AD conversion unit 21.

The AD conversion unit 21 of the present embodiment is configured to be able to selectively connect the first bit-memories 550a to 550d to the transmission line 43 via one output circuit 56. Thereby, compared to a case where all the first bit-memories 550a to 550d are directly connected to the transmission line 43, the load such as a parasitic capacitance added to the transmission line 43 can be reduced. Therefore, according to the present embodiment, an increase in the rate of serial transmission can be realized.

First bit-memories included in the AD conversion unit 21 on a row next to a row on which the first bit-memories 550a to 550d described above are arranged are referred to as first bit-memories 550e to 550h, and switches corresponding thereto are referred to as switches 551e to 551h. Scan signals S5 to S8 are input to the switches 551e to 551h from the ADC scanning circuit 41, respectively, and when the scan signals S5 to S8 are at the active level, the switches 551e to 551h are turned on, respectively. Further, the switch 562 on a row on which the first bit-memories 550e to 550h are arranged is controlled by a scan signal SO2, and when the scan signal SO2 is at the active level, the switch 562 is turned on.

After the scan signals S1 to S4 are sequentially controlled to the active level, the ADC scanning circuit 41 sequentially controls the scan signals S5 to S8 to the active level. Further, the ADC scanning circuit 41 controls the scan signal SO2 to the active level in a period when the scan signals S5 to S8 are controlled to the active level. Thus, by the AD conversion units 21 on the plurality of rows being sequentially scanned in such a way, respective bit signals of a digital signal are serially transmitted to one transmission line 43 via the output circuit 56.

The buffer memory 25 has a select circuit 60, a switch 61, and a second memory 250. The second memory 250 has the plurality of second bit-memories 250a to 250h arranged over a plurality of rows and a plurality of columns.

The second memory 250 has a plurality of second bit-memories 250a to 250h provided over a plurality of columns (two columns in the present embodiment) for the AD conversion unit 21 on a single column. The second bit-memories 250a to 250h on a certain column of the second bit-memories 250a to 250h on the plurality of columns are said to be one memory group. At the same time, the second bit-memories 250a to 250h on another column are said to be another memory group. That is, the second memory 250 has a plurality of memory groups for the AD conversion unit 21 on a single column. A plurality of memory groups are provided for the AD conversion units 21 on a single column, and thereby the second memory 250 can store a plurality of digital signals output from the AD conversion unit 21 on a single column at different timings. Such a plurality of digital signals may correspond to a signal based on an incident light to the pixel 11 and a signal based on a reset state of the pixel 11.

The select circuit 60 has a function of selecting which of a plurality of memory groups a digital signal is to be stored in. The select circuit 60 may be a demultiplexer, for example. The select circuit 60 is provided on a column basis of the AD conversion unit 21. The input terminal of the select circuit 60 is connected to the transmission line 43. The control terminal of the select circuit 60 is input with a control signal SEL1 from the timing generator 30, and a terminal to output data is controlled.

The output terminal of the select circuit 60 is connected to the plurality of second bit-memories 250a to 250d via one switch 61 controlled by a scan signal SI1. Further, the output terminal of the select circuit 60 is connected to the plurality of second bit-memories 250e to 250h via another switch 61 controlled by a scan signal SI2. That is, the switch 61 is an input circuit to which bit signals output from the first bit-memories 550a to 550d or the first bit-memories 550e to 550h are commonly input.

When the control signal SEL1 is at the active level, the select circuit 60 transmits respective bit signals transmitted from the transmission line 43 to the second bit-memories 250a to 250h provided on one set of columns of the plurality of columns. In contrast, when the control signal SEL1 is at the non-active level, the select circuit 60 transmits respective bit signals transmitted from the transmission line 43 to the second bit-memories 250a to 250h provided on the other set of columns of the plurality of columns.

The memory vertical scanning circuit 45 outputs a scan signal Sxy (x is an integer from 1 to 8, and y is 1 or 2) to the second bit-memories 250a to 250h on the corresponding row and column. Further, the memory vertical scanning circuit 45 outputs the scan signals SI1 and SI2 to the corresponding switches 61. The memory vertical scanning circuit 45 is a second scanning circuit that scans the plurality of second bit-memories 250a to 250h in the first direction. The memory vertical scanning circuit 45 performs a scan to select the second bit-memories 250a to 250h to receive a bit signal input via the switch 61.

The memory vertical scanning circuit 45 sequentially controls scan signals S1y to S4y to the active level in a period in which the scan signals S1 to S4 are controlled to the active level, respectively. Further, the memory vertical scanning circuit 45 controls the scan signal SI1 to the active level in a period in which the scan signals S1*y* to S4*y* are controlled to the active level. Thereby, bit signals output from the first bit-memories 550*a* to 550*d* via the output circuit 56 are held in the second bit-memories 250*a* to 250*d* via the select circuit 60 and the switch 61.

A transmission line group 260 is connected to the output terminals of the second bit-memories 250*a* to 250*h*. The memory horizontal scanning circuit 48 sequentially selects multiple columns of the transmission line group 260 and transfers bit signals from the second bit-memories 250*a* to 250*h* to the digital signal processing circuit 28.

The buffer memory 25 of the present embodiment can store a bit signal of one bit, which is different from other bits, in the plurality of second bit-memories 250*a* to 250*d* via the single switch 61. Thereby, since only the second bit-memory corresponding to the turned-on switch 61 is connected to the output circuit 56, the number of second bit-memories connected to the output circuit 56 is reduced compared to the case without the switch 61. Therefore, when viewed from the output circuit 56 side, a load capacitance of an element such as a transistor forming the second bit-memory is reduced. As discussed above, in the present embodiment, since a load viewed from the output circuit 56 side is reduced, an increase in the rate of serial transmission is realized.

Figure 6:
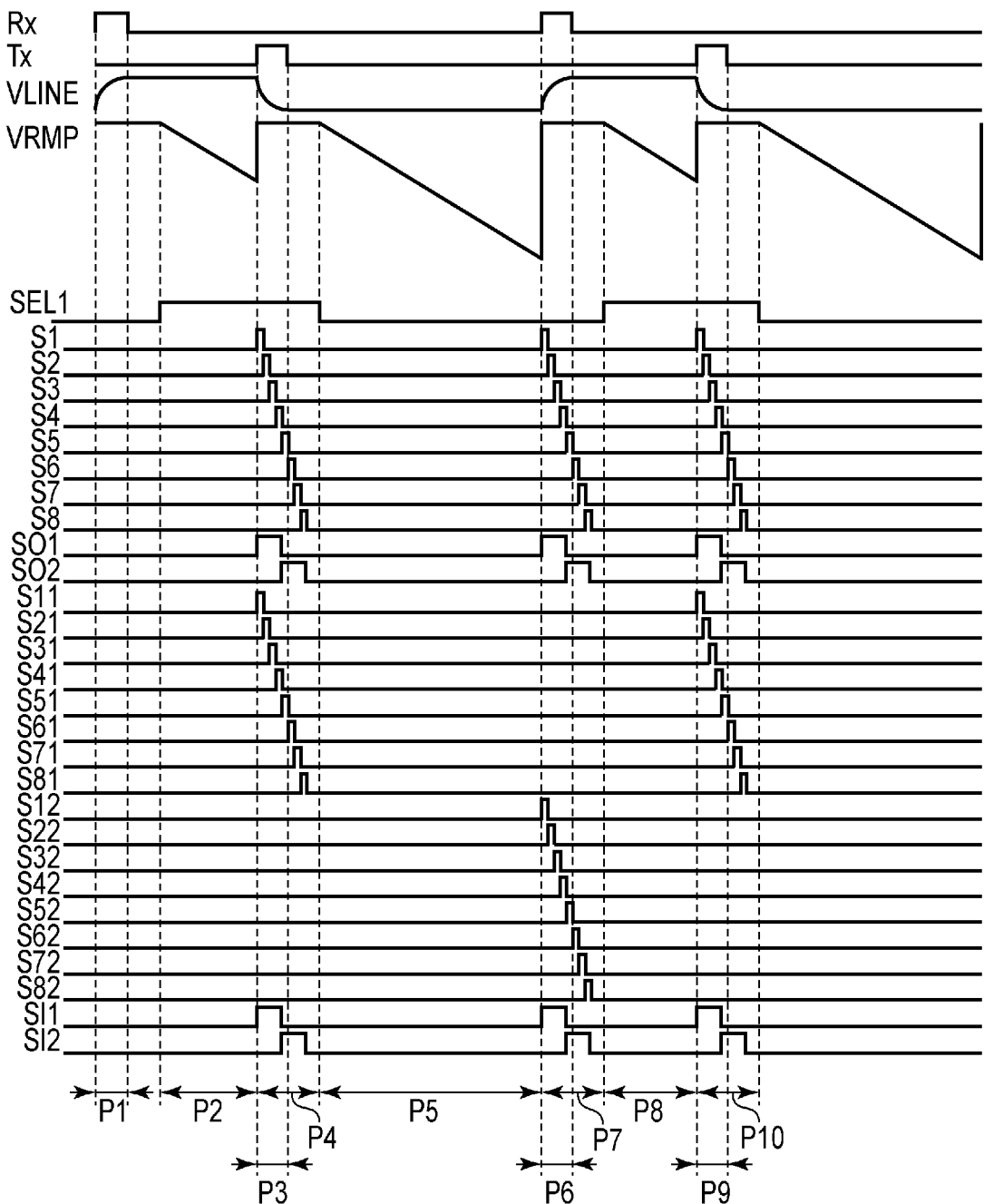
FIG. 6 is a timing diagram illustrating an operation of the imaging device according to the first embodiment.

FIG. 6 is a timing diagram illustrating the operation of the imaging device of the present embodiment. The references of control signals or the like illustrated in FIG. 6 correspond to those illustrated in FIG. 2, FIG. 4B, and FIG. 5. Further, a potential VLINE illustrated in FIG. 6 denotes the potential of the signal line 201. This timing diagram illustrates the level of each control signal when a signal is read out from the pixel 11 on a certain row and timings of the ramp signal VRMP and the potential VLINE of the signal line 201.

In the period P1, the vertical scanning circuit 24 controls, to the active level, the control signal Rx output to the pixel 11 on a row from which signals are output. Thereby, the reset transistor 606 is activated, and the potential of the FD region 605 is reset. After the period P1, the potential VLINE of the signal line 201 becomes a potential in accordance with the potential of the FD region 605 resulted after reset is released. Thereby, a signal corresponding to a reset state (a noise signal) is output to the signal line 201.

In the period P2, the ramp signal generation unit 35 monotonically changes the potential of the ramp signal VRMP to be output. A monotonic change as used herein means that a direction of a change of the potential with time is maintained in the same direction from the start to the end of the change. Even when the potential change rate of a ramp signal per unit time changes during the start to the end of the change, such a change is included in a monotonic change. In other words, a monotonic change means that the potential monotonically increases or monotonically decreases with time from the start to the end of the change.

Since the potential of the ramp signal VRMP in the period P2 monotonically changes, the level of the comparison result signal changes at the timing when the level relationship between the potential of an analog signal output from the pixel 11 and the potential of the ramp signal VRMP changes. Each of the first bit-memories 550*a* to 550*d* holds the count signal Count obtained when the level of the comparison result signal changes. This count signal Count is a digital signal based on a noise signal. Hereafter, this digital signal may be denoted as N-data.

In the period P3, the vertical scanning circuit 24 controls, to the active level, the control signal Tx to be output to the pixel 11 on a row from which a signal is output. Thereby, the transfer transistor 603 is turned on, and charges accumulated in the photoelectric conversion unit 13 are transferred to the FD region 605. The potential of the FD region 605 decreases due to transferred charges. In response to a reduction in the potential of the FD region 605, the potential VLINE of the signal line 201 decreases. In such a way, a signal corresponding to charges generated by the photoelectric conversion unit 13 (optical signal) is output to the signal line 201.

In the period P4, the timing generator 30 controls, to the active level, the control signal SEL1 to be output to the select circuit 60. Thereby, bit signals output from the first bit-memories 550*a* to 550*d* may be output to the second bit-memories 250*a* to 250*h* on one set of columns of the second memories 250 via the output circuit 56, the select circuit 60, and the switch 61.

Further, in the period P4, the ADC scanning circuit 41 sequentially controls the scan signals S1 to S8 to the active level. Further, the ADC scanning circuit 41 controls the scan signal SO1 to the active level in a period in which the scan signals S1 to S4 are controlled to the active level and controls the scan signal SO2 to the active level in a period in which the scan signals S5 to S8 are controlled to the active level. The memory vertical scanning circuit 45 sequentially controls the scan signals S11, S21, S31, S41, S51, S61, S71, S81, SI1, and SI2 to the active level in accordance with driving of the scan signals S1 to S8, SO1, and SO2.

In this scan, for example, in a period in which the scan signal S1 and the scan signal SO1 are at the active level, the scan signal S11 and the scan signal SI1 are also at the active level. Thereby, the switches 551*a*, 562, and 61 are turned on, the active level scan signal S11 is input to the second bit-memory 250*a* on one set of columns of the second memories 250. At this time, the bit signal output by the first bit-memory 550*a* is held in the second bit-memory 250*a* on one set of columns of the second memories 250.

Similarly, bit signals of N-data held in the first memory 55 of the AD conversion unit 21 are transferred to and held in the second bit-memories 250*a* to 250*d*. Furthermore, bit signals of N-data held in the first memory 55 of the AD conversion unit 21 on the same column as and on the different row from the first memory 55 described above are transferred to and held in the second bit-memories 250*e* to 250*h*.

Note that the period P3 is included in a part of the period P4. That is, in the period P4, the operation to transmit bit signals from the first bit-memories 550*a* to 550*h* to the second bit-memories 250*a* to 250*h* and the operation to transfer charges from the photoelectric conversion unit 13 to the FD region 605 are performed in parallel.

In the period P5, the ramp signal generation unit 35 monotonically changes the potential of the ramp signal VRMP to be output in the same manner as in the period P2. The first bit-memories 550*a* to 550*d* hold the count signal Count obtained when the signal level of the comparison result signal changes. The count signal Count is a digital signal based on an optical signal. Hereafter, this digital signal may be denoted as S-data.

In the period P6, the vertical scanning circuit 24 controls, to the active level, the control signal Rx output to the pixel 11 on the next row. Thereby, the reset transistor 606 on the next row is activated, and the potential of the FD region 605 is reset. After the period P6, the potential VLINE of the signal line 201 becomes a potential in accordance with the potential of the FD region 605 resulted after reset is released.

Thereby, a signal corresponding to a reset state (a noise signal) of the pixel 11 on the next row is output to the signal line 201.

In the period P7, the timing generator 30 controls, to the non-active level, the control signal SEL1 to be output to the select circuit 60. Thereby, bit signals output from the first bit-memories 550a to 550d may be output to the second bit-memories 250a to 250h on the other set of columns of the second memories 250 via the output circuit 56, the select circuit 60, and the switch 61.

Further, in the period P7, the ADC scanning circuit 41 sequentially controls the scan signals S1 to S8 to the active level. Further, the ADC scanning circuit 41 controls the scan signal SO1 to the active level in a period in which the scan signals S1 to S4 are controlled to the active level and controls the scan signal SO2 to the active level in a period in which the scan signals S5 to S8 are controlled to the active level. The memory vertical scanning circuit 45 sequentially controls the scan signals S12, S22, S32, S42, S52, S62, S72, S82, SI1, and SI2 to the active level in accordance with driving of the scan signals S1 to S8, SO1, and SO2.

In this scan, for example, in a period in which the scan signal S1 and the scan signal SO1 are at the active level, the scan signal S12 and the scan signal SI1 are at the active level. Thereby, the switches 551a, 562, and 61 are turned on, the active level scan signal S12 is input to the second bit-memory 250a on the other set of columns of the second memories 250. At this time, the bit signal output by the first bit-memory 550a is held in the second bit-memory 250a on the other set of columns of the second memories 250.

Similarly, bit signals of S-data held in the first memory 55 of the AD conversion unit 21 are transferred to and held in the second bit-memories 250a to 250d. Furthermore, bit signals of S-data held in the first memory 55 of the AD conversion unit 21 on the same column as and on the different row from the first memory 55 described above are transferred to and held in the second bit-memories 250e to 250h.

Further, in the period P10, transfer of N-data from the pixel 11 on the next row is performed in the same manner as in the period P4. That is, bit signals of N-data held in the first memory 55 are transferred to and held in the second bit-memories 250a to 250d. Furthermore, bit signals of N-data held in the first memory 55 of the AD conversion unit 21 on the same column as and on the different row from the first memory 55 described above are transferred to and held in the second bit-memories 250e to 250h.

In the present embodiment, the first bit-memories 550a to 550d and the second bit-memories 250a to 250d are connected by the transmission line 43, and serial transmission is performed. Thereby, the number of transmission lines 43 can be reduced, and the wiring area of the transmission lines 43 in the AD conversion region 22 is reduced.

Inside the AD conversion region 22, many elements used for performing AD conversion are arranged. Reduction of the wiring area of the transmission lines 43 enables a larger number of elements used for AD conversion to be secured even when the area of the AD conversion region 22 is limited. Thereby, it is possible to suppress an increase in AD conversion time that would occur when the number of elements used for AD conversion is insufficient.

One of the objects that may occur in serial transmission may be a reduction in transmission rate due to a load such as a parasitic capacitance of the transmission line 43, a load capacitance of the memory unit, or the like. In the present embodiment, the output circuit 56 that aggregates the output of the first bit-memories 550a to 550d is provided, and the parasitic capacitance due to the transmission line 43 is reduced. Further, in the present embodiment, the switch 61 that aggregates input of the second bit-memories 250a to 250d is provided, and the load capacitance due to the second bit-memories 250a to 250d is reduced.

As discussed above, in the present embodiment, in the configuration employing serial transmission, the reduced load realizes suppression of a reduction in a transmission rate. Therefore, according to the present embodiment, it is possible to provide an AD conversion device and an imaging device that can increase a transmission rate of a digital signal while suppressing an increase in the number of transmission lines.

In the present embodiment, the advantage obtained by the buffer memory 25 being provided will be described. Without the buffer memory 25 being provided, the imaging device of the present embodiment is configured such that a digital signal is transmitted from the AD conversion region 22 to the digital signal processing circuit 28 without via the buffer memory 25. In such a case, a digital signal is read out from the AD conversion unit 21 at a row and a column of a designated address out of the AD conversion units 21 arranged over a plurality of rows and a plurality of columns.

Inside the AD conversion region 22, many elements used for performing AD conversion, such as the comparator 51, are provided. Therefore, when a digital signal is directly transmitted to the digital signal processing circuit 28 from the AD conversion region 22, the wiring length of the transmission path between the plurality of AD conversion units 21 and the digital signal processing circuit 28 is different for respective AD conversion units 21. Therefore, when the transmission time from the AD conversion units 21 to the digital signal processing circuit 28 is set based on the AD conversion unit 21 having the longest transmission distance as a reference, the transmission time of digital signals from the AD conversion region 22 to the digital signal processing circuit 28 becomes longer. On the other hand, when the transmission time from the AD conversion units 21 to the digital signal processing circuit 28 is set based on the AD conversion unit 21 having the shortest transmission distance as a reference, a transmission failure of a digital signal may occur.

In contrast, in the present embodiment, digital signals are transmitted from the AD conversion units 21 to the buffer memory 25 and then transmitted from the buffer memory 25 to the digital signal processing circuit 28. Thereby, the difference in transmission time when digital signals are transmitted from the plurality of AD conversion units 21 to the digital signal processing circuit 28 can be reduced. It is thus possible to transmit digital signals at a high rate while ensuring sufficient time required for transmission of the digital signals.

Second Embodiment

FIG. 5 of the first embodiment illustrates the example in which the number of first bit-memories aggregated by the output circuit 56 is four and the number of second bit-memories aggregated by the switch 61 is also four, that is, these numbers are the same. In contrast, the present embodiment illustrates an example in which the number of second bit-memories aggregated by the switch 61 is larger than the number of first bit-memories aggregated by the output circuit 56.

Figure 7:
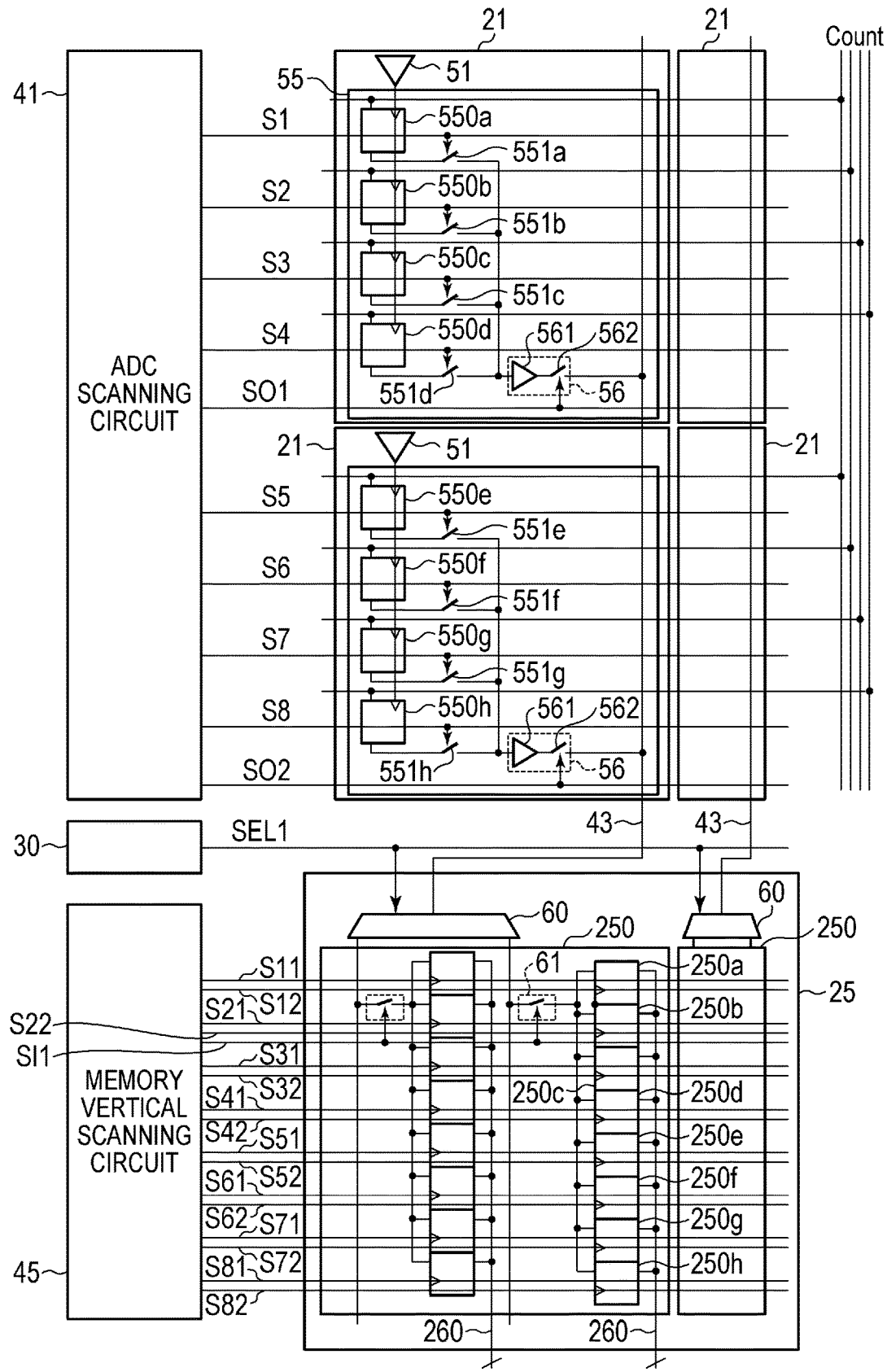
FIG. 7 is a circuit diagram illustrating in detail a configuration of AD conversion units and a buffer memory according to a second embodiment.

FIG. 7 is a block diagram illustrating the configuration of the AD conversion units 21 and the buffer memory 25 in detail. In FIG. 7, the number of first bit-memories aggregated by the output circuit 56 is four, and the number of second bit-memories aggregated by the switch 61 is eight. In such a way, in the present embodiment, the number of second bit-memories aggregated by the switch 61 is larger than the number of first bit-memories aggregated by the output circuit 56.

The comparator 51 is an element formed of a differential pair amplifier, for example. Thus, the length in the first direction in the layout of the comparator 51 is longer than an element such as the first bit-memory and is a non-ignorable length. Therefore, if the first bit-memories to which a plurality of comparators 51 were connected is aggregated by a single output circuit 56, the wiring used for aggregating the output terminals of the first bit-memories would be longer for the length of the comparator 51. Thus, aggregation of the second bit-memories by using the switch 61 results in less constraint in wiring design and easier design than aggregation of the first bit-memories, to which a plurality of comparators 51 are connected, by using a single output circuit 56. That is, as with the present embodiment, it is desirable in terms of less design constraint that the number of second bit-memories aggregated by the switch 61 be larger than the number of first bit-memories aggregated by the output circuit 56 or otherwise these numbers be the same as with the first embodiment.

In the present embodiment, the same advantages as those in the first embodiment are obtained. Furthermore, the first embodiment and the present embodiment are configured such that the number of second bit-memories aggregated by the switch 61 is larger than or equal to the number of first bit-memories aggregated by the output circuit 56, and this can reduce constraint in design.

Note that, in the case of the configuration of FIG. 7, since the second bit-memories 250a to 250h are aggregated by the single switch 61, there are some changes in the timing diagram illustrated in FIG. 6. Specifically, in the present embodiment, the scan signal SI1 is active in both a period in which the scan signal SI1 is active and a period in which the scan signal SI2 is active in FIG. 6.

Further, it is desirable that the number of second bit-memories aggregated by the switch 61 be a multiple of the number of first bit-memories aggregated by the output circuit 56. Since the rate of the number is an integer and thus no division remainder of the bit-memory occurs at transfer, readout can be performed efficiently.

Third Embodiment

The first embodiment and the second embodiment illustrate the example in which a plurality of first bit-memories connected to the single comparator 51 are aggregated by the single output circuit 56. In contrast, the present embodiment illustrates an example in which a plurality of first bit-memories connected to a plurality of comparators 51 are aggregated by the single output circuit 56.

Figure 8:
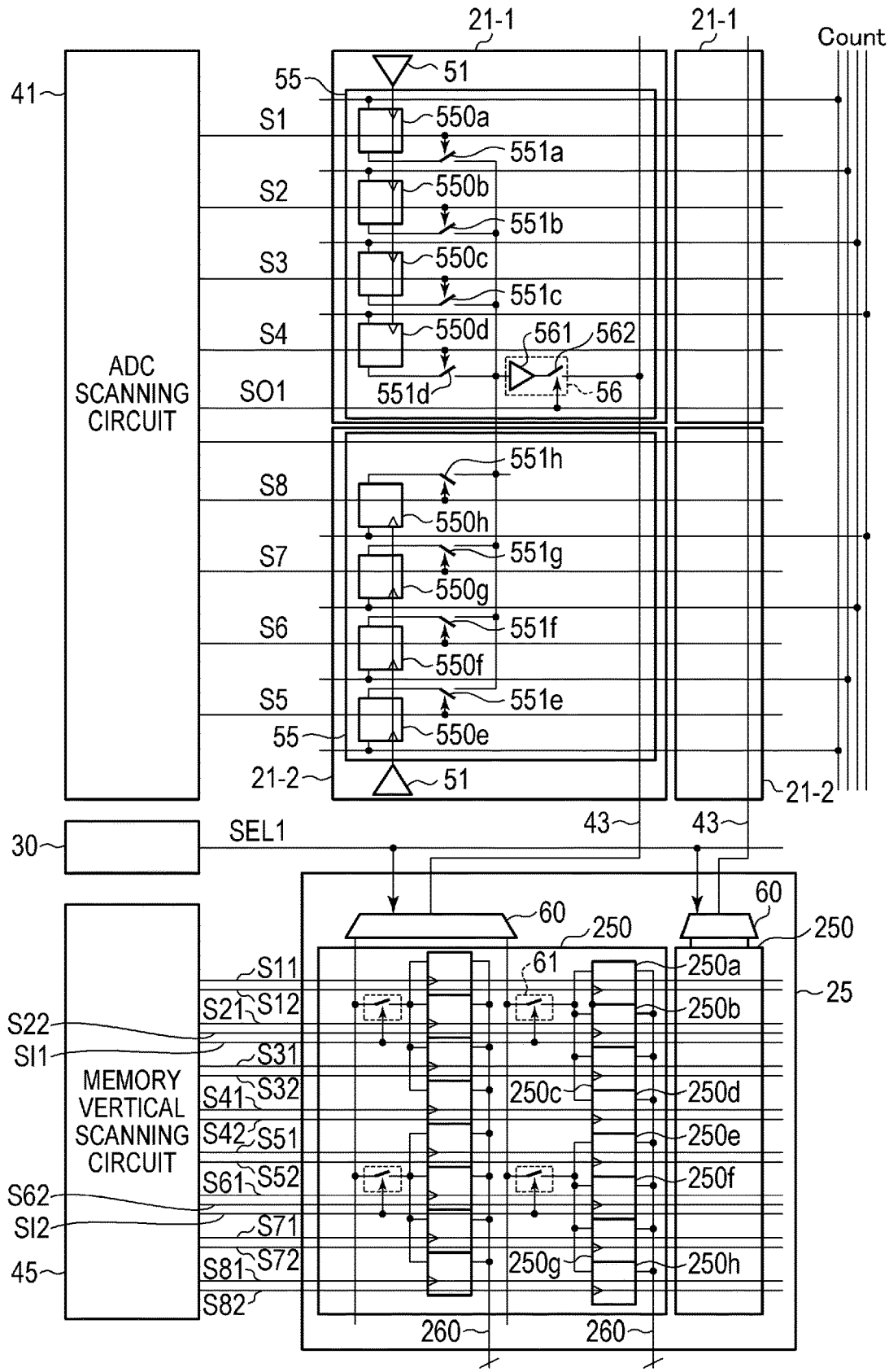
FIG. 8 is a circuit diagram illustrating in detail a configuration of AD conversion units and a buffer memory according to a third embodiment.

FIG. 8 is a block diagram illustrating the configuration of the AD conversion units 21 and the buffer memory 25 in detail. In the present embodiment, the AD conversion region 22 has an AD conversion unit 21-1 (first AD conversion unit) having the same configuration as the AD conversion unit 21 illustrated in FIG. 5 and an AD conversion unit 21-2 (second AD conversion unit) having a symmetrical layout of the AD conversion unit 21-1. In such a way, in the AD conversion units 21-1 and 21-2, the comparator 51 and a plurality of bit-memories may be arranged symmetrically.

In the present embodiment, as illustrated in FIG. 8, the first bit-memories 550a to 550d of the AD conversion unit 21-1 and the first bit-memories 550e to 550h of the AD conversion unit 21-2 are adjacent to each other in the layout. Thus, influence due to the length of the comparator 51 described in the second embodiment is cancelled, and it is easier to aggregate the first bit-memories 550a to 550d and the first bit-memories 550e to 550h by using one output circuit 56. This can also realize a configuration in which the number of first bit-memories aggregated by the output circuit 56 is larger than the number of the second bit-memories aggregated by the switch 61.

In the present embodiment, since the number of output circuits 56 connected to the transmission line 43 can be reduced, it is possible to further reduce the load of a parasitic capacitance occurring due to the transmission line 43 and, in addition, obtain the advantages of the first embodiment.

Note that, in the case of the configuration of FIG. 8, since the first bit-memories 550a to 550h are aggregated by the single output circuit 56, there are some changes in the timing diagram illustrated in FIG. 6. Specifically, in the present embodiment, the scan signal SO1 is active in both a period in which the scan signal SO1 is active and a period in which the scan signal SO2 is active in FIG. 6.

Fourth Embodiment

In the first embodiment, in a period P4, the scan signals S1 to S8 and S11 to S81 are sequentially controlled to the active level. In such a way, bit signals of all the bits are transmitted serially in the first embodiment. In contrast, an example in which bit signals of only some of the bits are transmitted serially will be described in the present embodiment.

A readout method of serially transmitting bit signals of only some of the bits reduces time of serial transfer and thus is used for the purpose of reducing the resolution of AD conversion to increase the readout rate. For example, since four first bit-memories are connected to one comparator 51 in the circuit configuration of FIG. 5, AD conversion at a resolution of four bits at the maximum can be performed. For some capture mode, however, it may be required to perform readout at a high rate by performing AD conversion at a lower resolution for faster processing.

Figure 9:
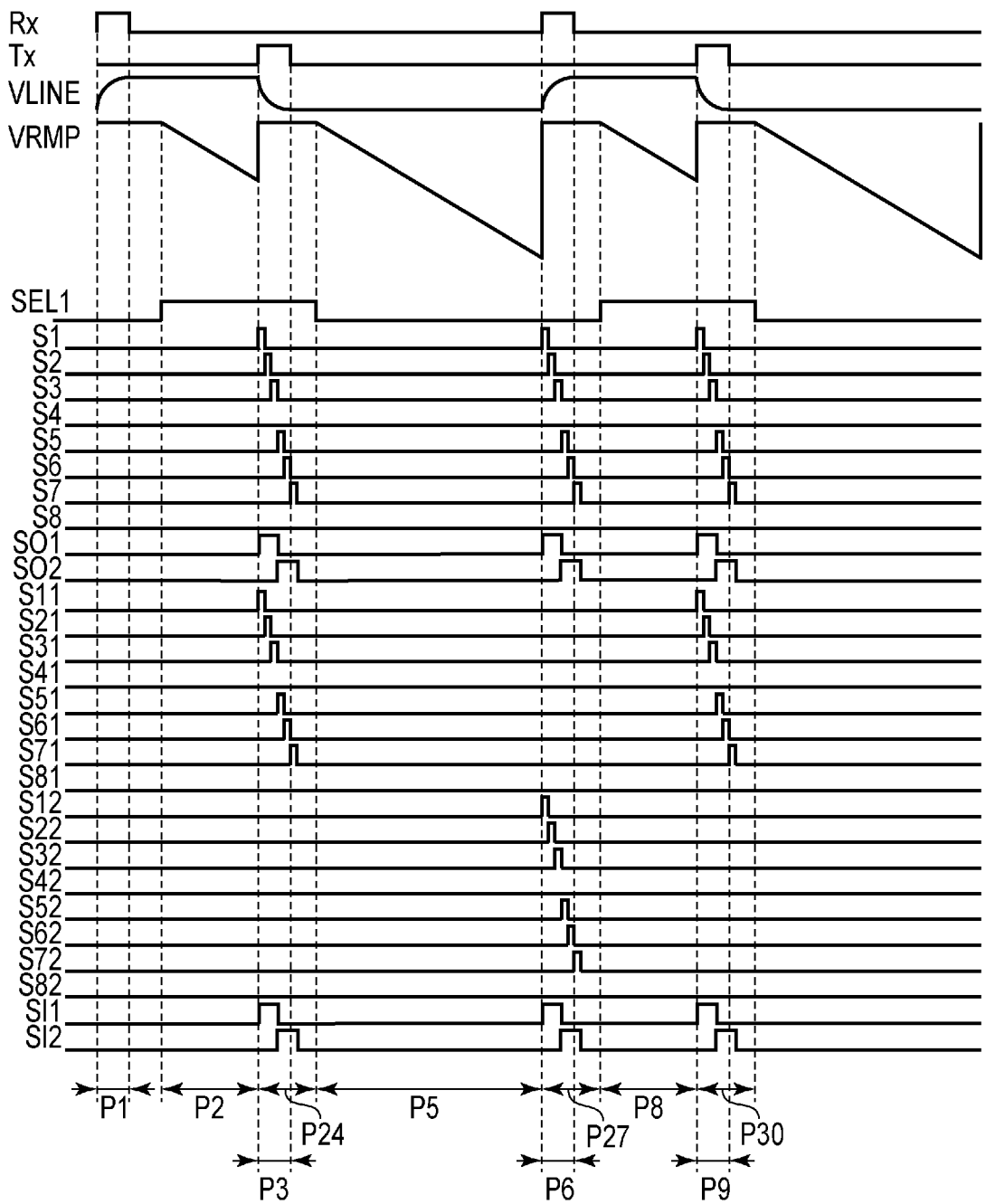
FIG. 9 is a timing diagram illustrating an operation of an imaging device according to a fourth embodiment.

FIG. 9 is a timing diagram illustrating the operation of the imaging device of the present embodiment. In the present embodiment, while the circuit configuration of the AD conversion units 21, the buffer memory 25, and the like is the same as that of the first embodiment, there is a difference from the first embodiment in that the resolution of AD conversion is three bits.

In the period P24, the ADC scanning circuit 41 sequentially controls the scan signals S1 to S3 and S5 to S7 to the active level. Further, the ADC scanning circuit 41 controls the scan signal SO1 to the active level in a period in which the scan signals S1 to S3 are controlled to the active level and controls the scan signal SO2 to the active level in a period in which the scan signals S5 to S7 are controlled to the active level.

Further, in the period P24, the memory vertical scanning circuit 45 sequentially controls the scan signals S11 to S31 and S51 to S71 to the active level in a period in which the scan signals S1 to S3 and S5 to S7 are controlled to the active level, respectively. Further, the memory vertical scanning circuit 45 controls the scan signal SD to the active level in a period in which the scan signals S11 to S31 are controlled to the active level and controls the scan signal SI2 to the active level in a period in which the scan signal S51 to S71 are controlled to the active level. In such a way, in the present embodiment, the scan signals S4, S8, S41, and S81 are not controlled to the active level, and there is a difference from the first embodiment in that bit signals of only three bits are transferred. Note that, in the periods P27 and P30, as illustrated in FIG. 9, since the same scan as that in the period P24 is performed, the description thereof will be omitted.

In the present embodiment, since the resolution of AD conversion is three bits, a bit signal of the fourth bit is unnecessary. By transferring bit signals of only three bits, it is possible to reduce time of serial transmission and achieve faster processing than in the first embodiment.

Note that the readout method in the first embodiment and the readout method in the fourth embodiment may be switched in accordance with selection of a capture mode or the like. A mode in which a digital signal is held by the first number of bit-memories (in this example, four bit-memories) as with the first embodiment is referred to as a first mode, and a mode in which a digital signal is held by the second number of bit-memories (in this example, three bit-memories) as with the fourth embodiment is referred to as a second mode. In such a case, the second number is smaller than the first number. That is, by changing the number of bit-memories selected by the ADC scanning circuit 41 and the memory vertical scanning circuit 45, switching between the first mode and the second mode is realized, and processing at a suitable rate is enabled in accordance with conditions such as a capture mode.

Fifth Embodiment

In the fourth embodiment, the example in which bit signals of only some bits are serially transmitted to increase a rate of readout has been illustrated. In contrast, in the present embodiment, an example in which a rate of readout is increased by serially transmitting bit signals held in only some of the AD conversion units will be illustrated.

Figure 10:
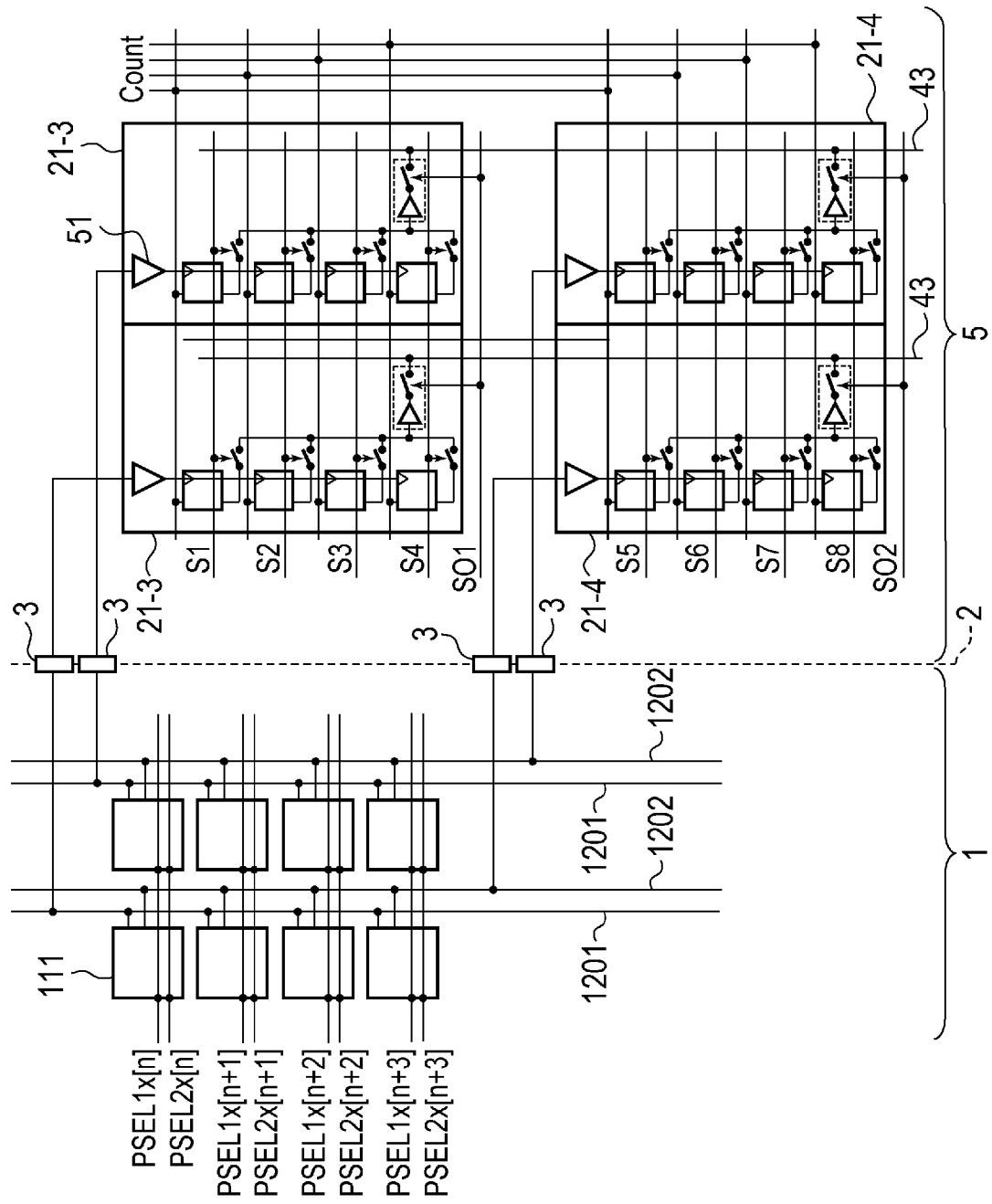
FIG. 10 is a diagram illustrating connection between a first chip and a second chip and a configuration of an AD conversion unit in an imaging device according to a fifth embodiment.
Figure 11:
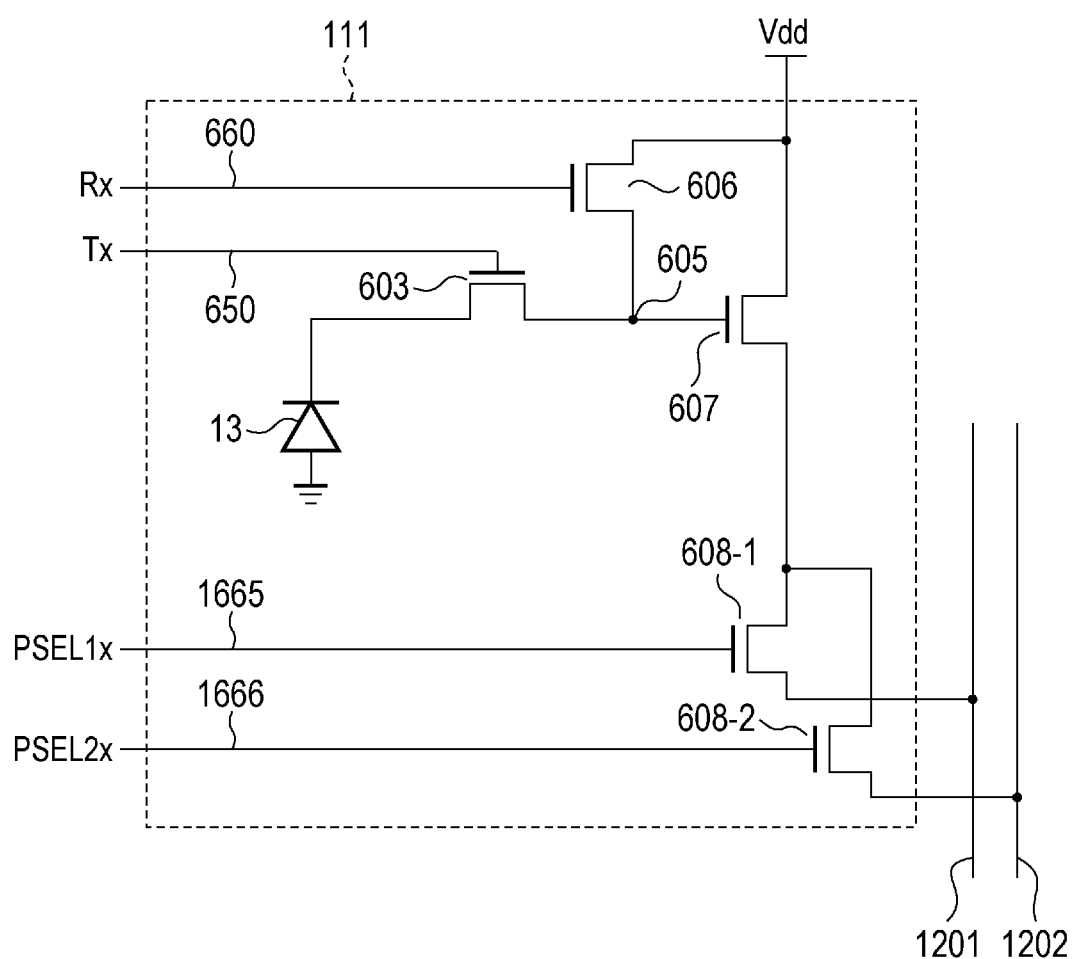
FIG. 11 is a diagram illustrating a circuit configuration of a pixel according to a fifth embodiment.

First, the configuration of an imaging device of the present embodiment will be described with reference to FIG. 10 and FIG. 11. FIG. 10 is a diagram illustrating the connection between the first chip 1 and the second chip 5 and the configuration of the AD conversion units 21-3 and 21-4 of an imaging device of the present embodiment. FIG. 11 is a diagram illustrating the circuit configuration of a pixel 111 of the present embodiment.

As illustrated in FIG. 11, the pixel 111 of the present embodiment has two select transistors 608-1 and 608-2. Both the drains of the two select transistors 608-1 and 608-2 are connected to the source of the amplification transistor 607. The source of the select transistor 608-1 is connected to the signal line 1201, and the drain of the select transistor 608-2 is connected to the signal line 1202. The vertical scanning circuit 24 supplies a control signal PSEL1$x$ to control the select transistor 608-1 via a control line 1665 and supplies a control signal PSEL2$x$ to control the select transistor 608-2 via a control line 1666.

Next, with reference to FIG. 10, a connection relationship between the pixels 111 and the AD conversion units 21-3 and 21-4 will be described. FIG. 10 illustrates the connection between the pixels 111 on four rows and two columns arranged in the first chip 1 and the AD conversion unit 21-3 and the AD conversion unit 21-4 on two rows and two columns arranged in the second chip 5. Each pixel 111 is connected to two signal lines 1201 and 1202 and two control lines 1665 and 1666. Note that, in FIG. 10, a control signal on each row is distinguished and indicated by appending a row number such as PSEL1$x$[$n$], for example, to the control signal supplied from the control lines 1665 and 1666.

The pixel 111 outputs a signal to the signal line 1201 when the control signal PSEL1$x$ is at the active level and outputs a signal to the signal line 1202 when the control signal PSEL2$x$ is at the active level. In this configuration, by controlling both the control signals PSEL1$x$ and PSEL2$x$ on different rows to the active level, it is possible to output signals from the pixels 111 on two rows in parallel. The signal line 1201 is connected to the AD conversion unit 21-3 via the connection portion 3, and the signal line 1202 is connected to the AD conversion unit 21-4 via the connection portion 3. Thereby, the AD conversion units 21-3 and 21-4 can perform AD conversion on signals output from the pixels 111 on two rows in parallel. Note that it is not essential to perform readout on two rows in parallel as described above, and only the signal line 1201 and the AD conversion unit 21-3 may be used to perform readout on a row basis, for example. Further, a mode to perform readout on a two-row basis and a mode to read out on a row basis may be able to be switched for a case where fast readout is necessary and a case where fast readout is not necessary.

Figure 12:
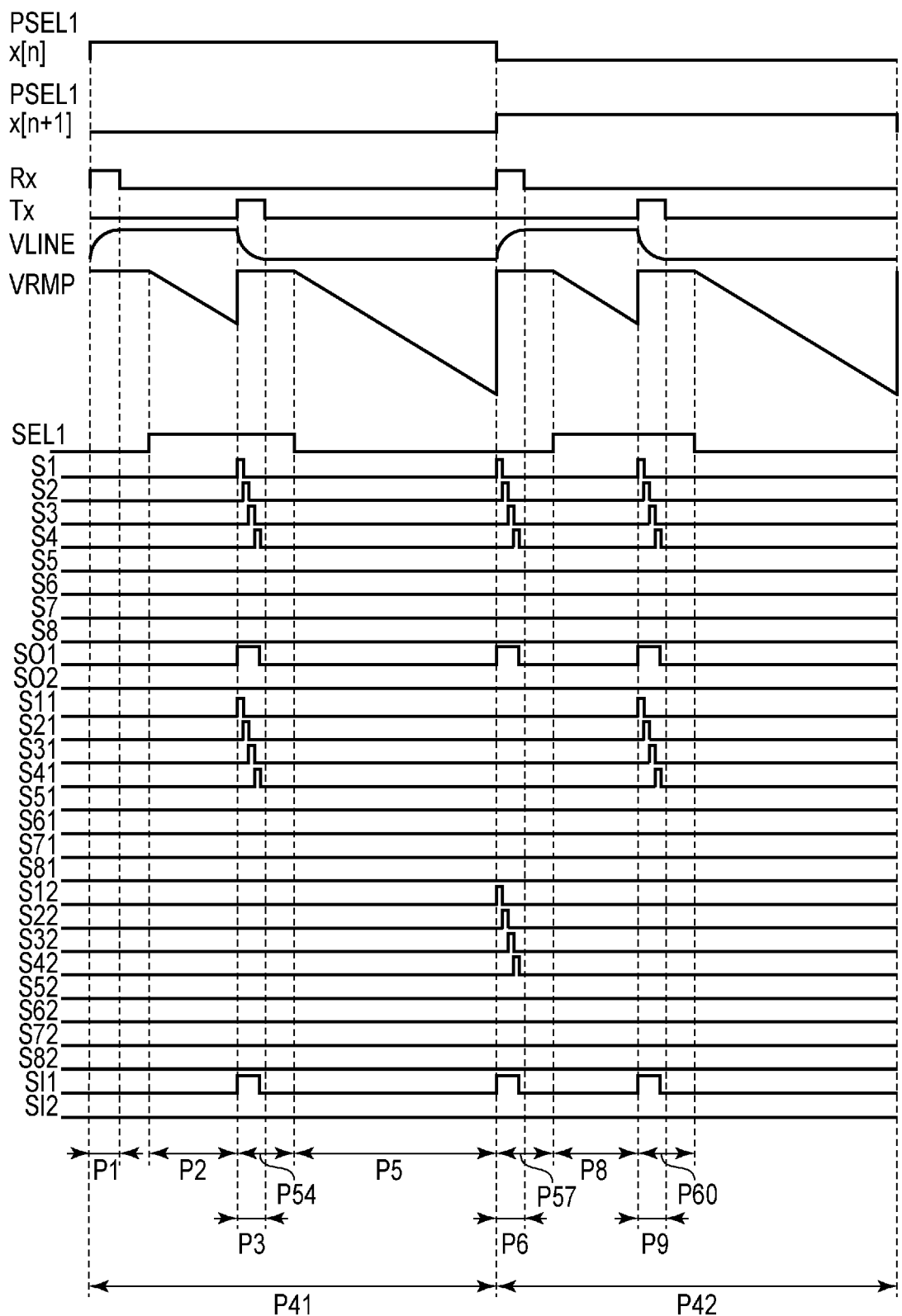
FIG. 12 is a timing diagram illustrating an operation of the imaging device according to the fifth embodiment.

FIG. 12 is a timing diagram illustrating the operation of the imaging device of the present embodiment. This timing diagram illustrates the operation when the pixels 111 on two rows of the n-th row and the (n+1)-th row are read out sequentially on a row basis. While the control signal PSEL2$x$ is not illustrated in FIG. 12, the control signals PSEL2$x$ on all the rows are at the non-active level. Further, while indication of the row number is omitted for the control signals Tx and Rx, the control signals Tx and Rx on a row to be read out are at the active level.

In the period P41, the control signal PSEL1$x$[$n$] is controlled to the active level, and the pixels 111 on the n-th row are connected to the signal line 1201. Further, in the period P42, the control signal PSEL1$x$[$n$+1] is controlled to the active level, and the pixels 111 on the (n+1)-th row are connected to the signal line 1201.

In the period P54 within the period P41, the ADC scanning circuit 41 sequentially controls the scan signals S1 to S4 to the active level. Further, the ADC scanning circuit 41 controls the scan signal SO1 to the active level in the period in which the scan signals S1 to S4 are controlled to the active level.

Further, in the period P54, the memory vertical scanning circuit 45 sequentially controls the scan signals S11 to S41 to the active level in a period in which the scan signals S1 to S4 are controlled to the active level, respectively. Further, the memory vertical scanning circuit 45 controls the scan signal SI1 to the active level in a period in which the scan signals S11 to S41 are controlled to the active level. The same scan is performed in the periods P57 and P60.

As discussed above, the present embodiment is different from the first embodiment in that the scan signals S5 to S8 and SO2 are not controlled to the active level. Thereby, a scan of the first bit-memory of the AD conversion unit 21-4 that is not used in this mode is skipped, and a reduction of a serial transfer period is realized.

Note that the first mode to scan the first bit-memories of all the AD conversion units as described in the first embodiment and the second mode not to scan the first bit-memory of some of the AD conversion units as illustrated in FIG. 12 may be able to be switched in accordance with selection of a capture mode or the like. A digital signal is held in the first number of AD conversion units (memory regions) in the first mode, and a digital signal is held in the second number of AD conversion units (memory regions) in the second mode.

In this case, the second number is smaller than the first number. That is, the change of the number of AD conversion units (memory regions) selected by the ADC scanning circuit 41 and the memory vertical scanning circuit 45 realizes switching between the first mode and the second mode and enables processing at a suitable rate in accordance with conditions such as a capture mode.

Sixth Embodiment

In the first embodiment to the fifth embodiment, the imaging device is formed of two chips, namely, the first chip 1 and the second chip 5. However, the number of chips forming the imaging device is not limited to two but may be one or may be three or greater. In the present embodiment, an example where the imaging device is formed of three chips will be described.

Figure 13:
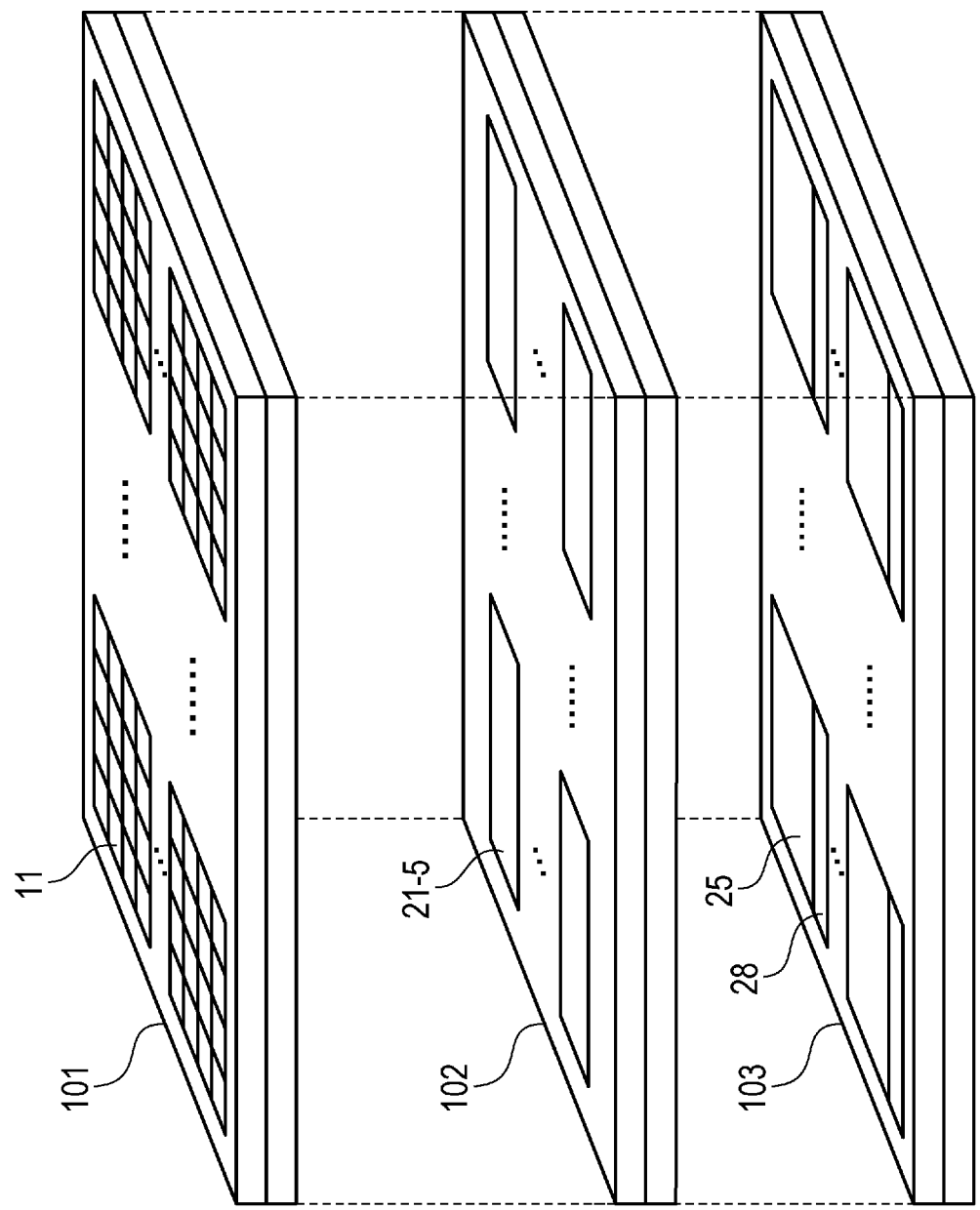
FIG. 13 is an exploded perspective view illustrating a general configuration of an imaging device according to a sixth embodiment.

FIG. 13 is an exploded perspective view illustrating the general configuration of the imaging device of the present embodiment. The imaging device has the structure in which a first chip 101, a second chip 102, and a third chip 103 are stacked in this order. FIG. 13 indicates the first chip 101, the second chip 102, and the third chip 103 as being separated vertically from each other.

The first chip 101 has the pixels 11 arranged over a plurality of rows and a plurality of columns. The configuration of each pixel 11 is the same as that in FIG. 2, for example, and includes the photoelectric conversion unit 13. The second chip 102 has an AD conversion unit 21-5 arranged over a plurality of rows and a plurality of columns. The third chip 103 has a plurality of buffer memories 25 and a plurality of digital signal processing circuits 28.

Figure 14B:
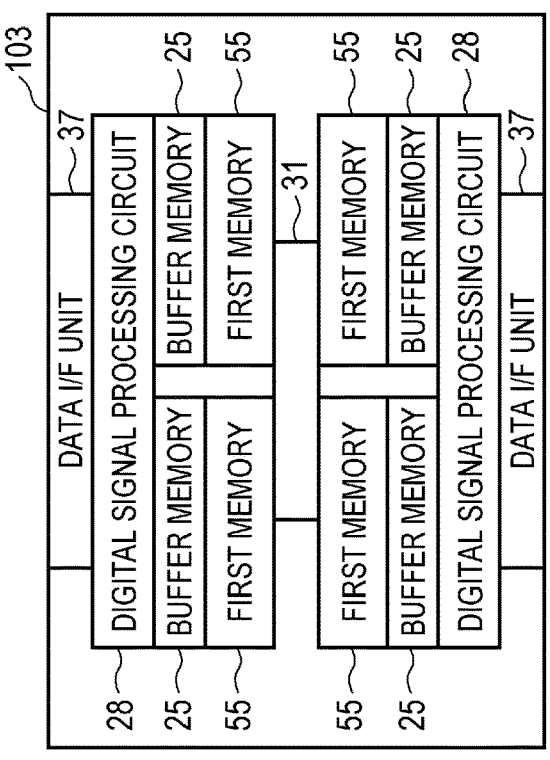
FIG. 14B is a block diagram illustrating a configuration of a third chip according to the sixth embodiment.
Figure 14A:
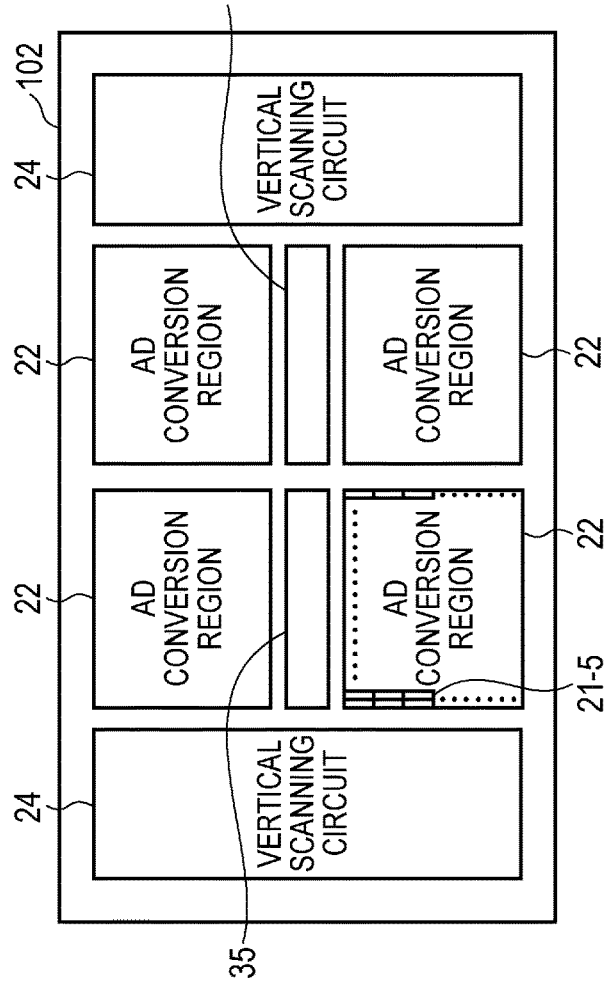
FIG. 14A is a block diagram illustrating a configuration of a second chip according to the sixth embodiment.

FIG. 14A is a block diagram illustrating the configuration of the second chip 102. The second chip 102 has the AD conversion regions 22, the vertical scanning circuits 24, the timing generator 30, and the ramp signal generation unit 35. Each of the AD conversion regions 22 includes a plurality of AD conversion units 21-5 arranged over a plurality of rows and a plurality of columns.

FIG. 14B is a block diagram illustrating the configuration of the third chip 103. The third chip 103 has the buffer memories 25, digital signal processing circuits 28, the counter 31, the data interface units 37, and the first memories 55.

Figure 14C:
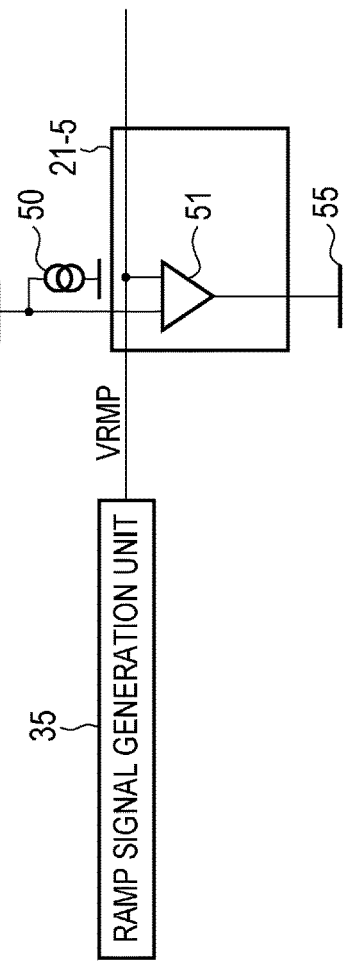
FIG. 14C is a block diagram illustrating a configuration of an AD conversion unit according to the sixth embodiment.

FIG. 14C is a block diagram illustrating the configuration of the AD-conversion unit 21-5 in more detail. The comparator 51 outputs, to the first memory 55 arranged in the third chip 103, a comparison result signal indicating a result of comparison between an analog signal from the pixel 11 and the ramp signal VRMP.

As described above, in the imaging device according to the present embodiment, unlike the first embodiment to the fifth embodiment, each first memory 55 is provided outside the AD conversion unit 21-5. More specifically, the first memory 55 is arranged in the third chip 103 and thus arranged in a chip different from the AD conversion unit 21-5.

As described above, the imaging device of the present embodiment is formed of three chips, namely, the first chip 101, the second chip 102, and the third chip 103. Further, in the imaging device of the present embodiment, the AD conversion unit 21-5 having the comparator 51 and the first memory 55 configured to receive the output from the AD conversion unit 21-5 are provided in the different chips.

Even with such a configuration, the same advantages as those of the first embodiment can be obtained.

Seventh Embodiment

In the imaging devices of the first embodiment to the sixth embodiment, elements forming a pixel and elements forming an AD conversion unit are provided separately. However, elements forming a pixel and elements forming an AD conversion unit may be partially shared. In the present embodiment, an example in which the amplification transistor 607 in FIG. 2 also serves as some of the elements forming a comparator will be described.

Figure 15:
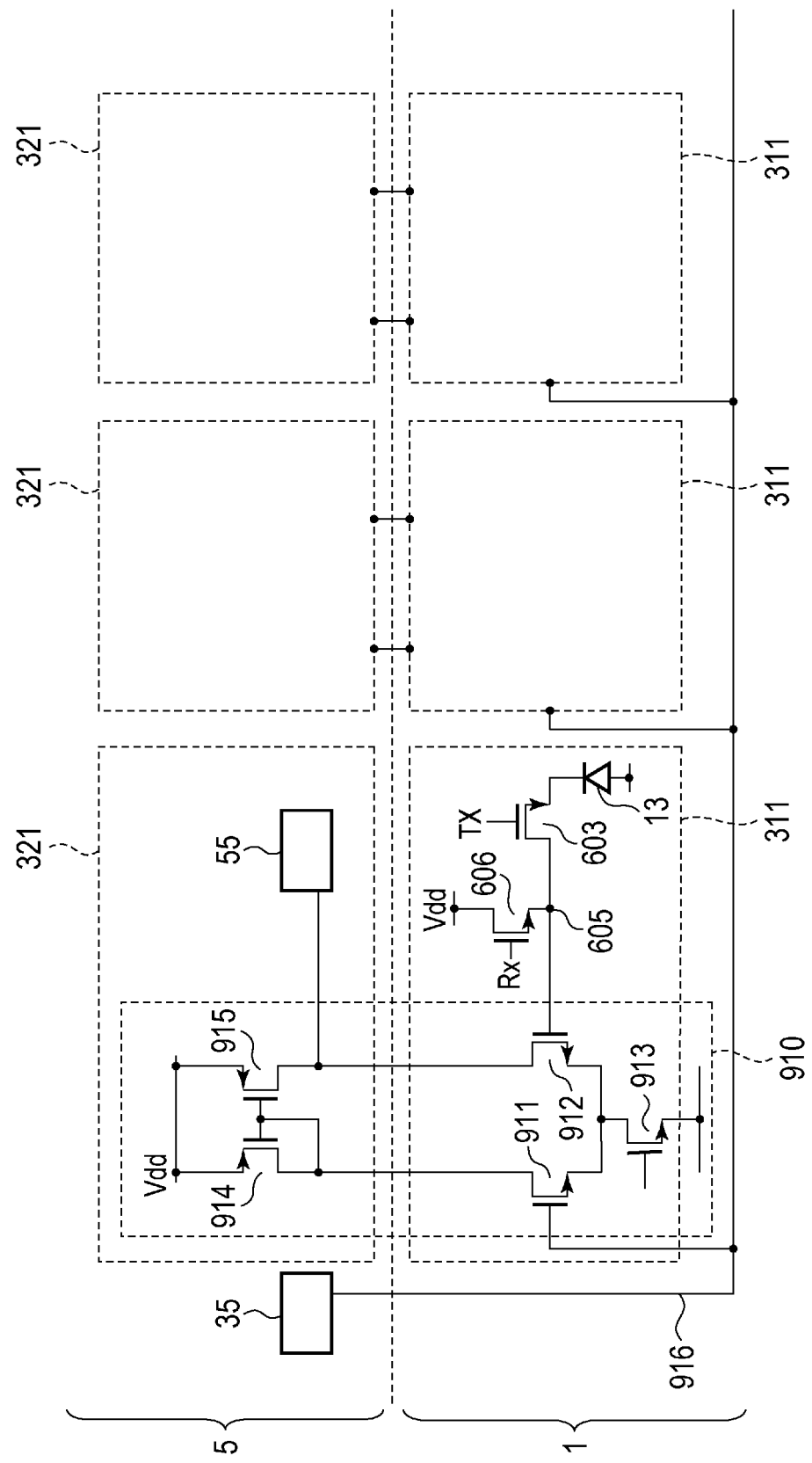
FIG. 15 is a diagram illustrating a circuit configuration of an imaging device according to a seventh embodiment.

FIG. 15 is a diagram illustrating a circuit configuration of an imaging device according to the present embodiment. The first chip 1 has a plurality of pixels 311, and the second chip 5 has a plurality of AD conversion units 321 and the ramp signal generation unit 35.

The pixel 311 has the photoelectric conversion unit 13, the transfer transistor 603, the reset transistor 606, input transistors 911 and 912, and a current source transistor 913. The input transistors 911 and 912 and the current source transistor 913 each are an N-channel MOS transistor.

The AD conversion unit 321 has the first memory 55 and the load transistors 914 and 915. The load transistors 914 and 915 each are a P-channel MOS transistor.

The connection relationship of the photoelectric conversion unit 13, the transfer transistor 603, and the reset transistor 606 is the same as that illustrated in FIG. 2. The node at which the drain of the transfer transistor 603, the source of the reset transistor 606, and the gate of the input transistor 912 are connected forms the FD region 605.

The source of the input transistor 911 and the source of the input transistor 912 are connected to the drain of the current source transistor 913. A predetermined voltage is applied to the gate of the current source transistor 913 so as to cause the current source transistor 913 to operate as a constant current source. The source of the current source transistor 913 is connected to the ground voltage line. The ramp signal VRMP is input from the ramp signal generation unit 35 to the gate of the input transistor 911.

The drain of the input transistor 911 is connected to the drain of the load transistor 914, and the drain of the input transistor 912 is connected to the drain of the load transistor 915. The sources of the load transistors 914 and 915 are connected to the power source voltage line Vdd. The gate of the load transistor 914, the drain of the load transistor 914, and the gate of the load transistor 915 are connected to each other. As described above, the load transistors 914 and 915 form a current mirror circuit. The connection node of the drain of the input transistor 912 and the drain the load transistor 915 is connected to the first memory 55.

The input transistors 911 and 912, the current source transistor 913, and the load transistors 914 and 915 form a differential pair 910. The gate of the input transistor 911 and the gate of the input transistor 912 correspond to the input terminal of the differential pair 910, and the connection node of the drain of the input transistor 912 and the drain of the load transistor 915 corresponds to the output terminal of the differential pair 910. The differential pair 910 outputs, to the first memory 55, a comparison result signal indicating a result of comparison of the gate potential of the input transistor 911 and the gate potential of the input transistor 912. As discussed above, the differential pair 910 is a comparator that compares an analog signal based on charges generated by the photoelectric conversion unit 13 and the ramp signal VRMP.

In the imaging device of the present embodiment, the input transistor 912 of the pixel 311 has both a function of an amplification transistor that amplifies the potential based on charges generated by the photoelectric conversion unit 13 and a function of an input transistor of the differential pair 910. Further, a plurality of transistors forming the differential pair 910 are distributed and arranged over the first chip 1 and the second chip 5. Even with such a configuration, the same advantages as those of the first embodiment can be obtained.

Eighth Embodiment

Figure 16:
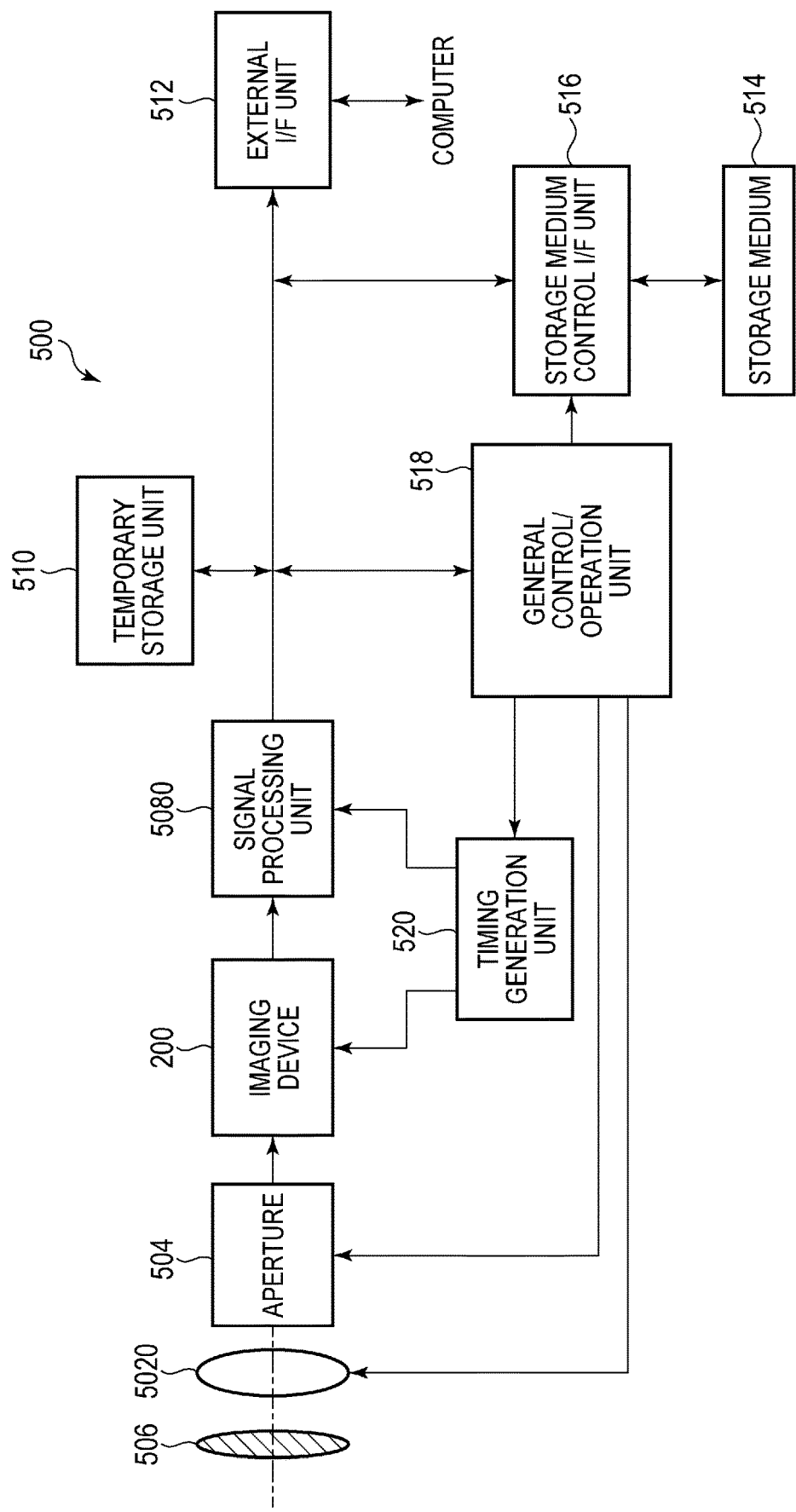
FIG. 16 is a block diagram illustrating a configuration example of an imaging system according to an eighth embodiment.

FIG. 16 is a block diagram illustrating the configuration of an imaging system 500 according to the present embodiment. The imaging system 500 of the present embodiment includes an imaging device 200 to which the configuration of any of the imaging device described in each embodiment described above is applied. A specific example of the imaging system 500 may be a digital still camera, a digital camcorder, a surveillance camera, or the like. FIG. 16 illustrates a configuration example of a digital still camera as one example.

The imaging system 500 illustrated as an example in FIG. 16 has the imaging device 200, a lens 5020 that captures an optical image of a subject on the imaging device 200, an aperture 504 used for changing a light amount passing through the lens 5020, and a barrier 506 used for protecting the lens 5020. The lens 5020 and the aperture 504 form an optical system that collects light on the imaging device 200.

Further, the imaging system 500 has a signal processing unit 5080 that performs processing of an output signal output from the imaging device 200. The signal processing unit 5080 performs a signal processing operation to perform various correction or compression on an input signal if necessary and output the processed signal.

The imaging system 500 further has a temporary storage unit 510 used for temporarily storing image data and an external interface unit (external I/F unit) 512 used for communicating with an external computer or the like. Furthermore, the imaging system 500 has a storage medium 514 such as a semiconductor memory used for performing storage or readout of captured data and a storage medium control interface unit (storage medium control OF unit) 516 used for performing storage or readout on storage medium 514. Note that the storage medium 514 may be built in the imaging system 500 or may be removable.

Furthermore, the imaging system 500 has a general control/operation unit 518 that performs various operations and controls the entire digital still camera and a timing generation unit 520 that outputs various timing signals to the imaging device 200 and the signal processing unit 5080. Here, the timing signal or the like may be externally input, and the imaging system 500 has at least the imaging device 200 and the signal processing unit 5080 that processes an output signal output from the imaging device 200. The general control/operation unit 518 and the timing generation unit 520 may be configured to implement a part or all of the control function of the imaging device 200.

The imaging device 200 outputs an imaging signal to the signal processing unit 5080. The signal processing unit 5080 performs predetermined signal processing on the imaging signal output from the imaging device 200 and outputs image data. Further, the signal processing unit 5080 uses the imaging signal to generate an image.

By using the imaging device of each embodiment described above to form the imaging system 500, it is possible to realize the imaging system 500 that enables faster capturing.

Ninth Embodiment

Figure 17A:
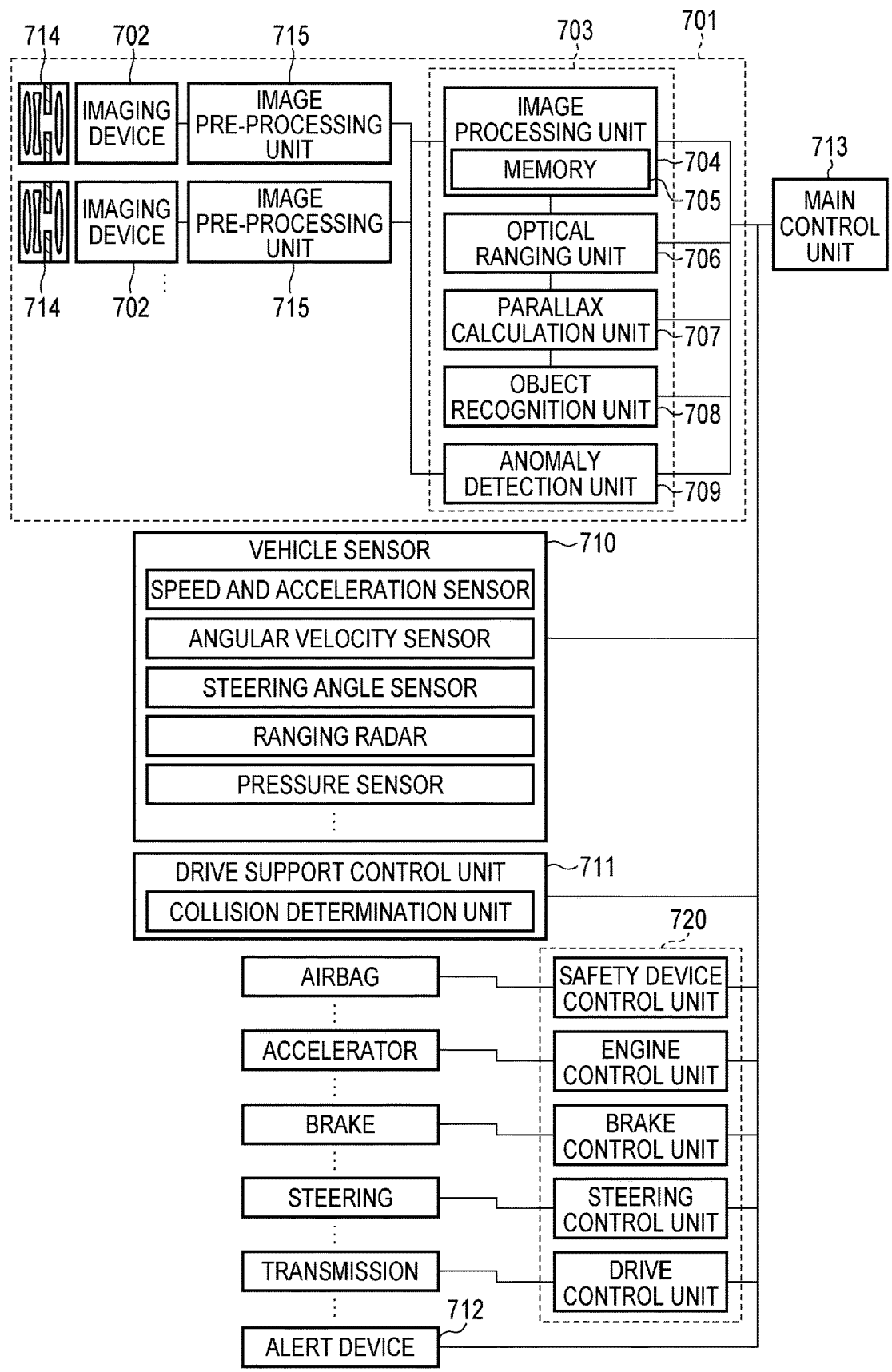
FIG. 17A is a view illustrating a configuration example of an imaging system and a vehicle according to a ninth embodiment.
Figure 18:
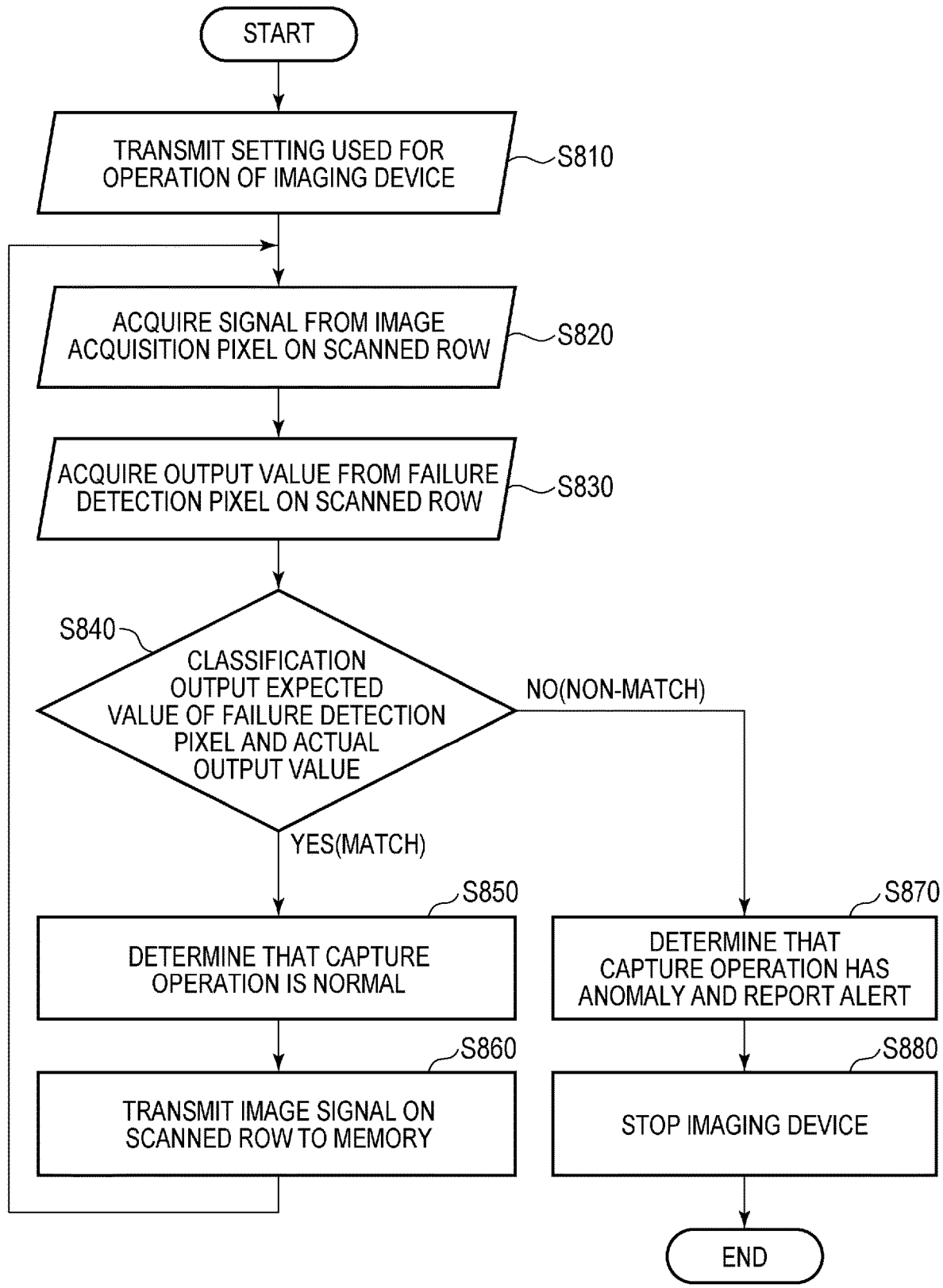
FIG. 18 is a flowchart illustrating an operation in an imaging system according to the ninth embodiment.

An imaging system 701 and a vehicle 700 of the present embodiment will be described by using FIG. 17A, FIG. 17B, and FIG. 18. FIG. 17A and FIG. 17B are diagrams illustrating each configuration example of the imaging system 701 and the vehicle 700 according to the present embodiment. FIG. 18 is a flowchart illustrating the operation of the imaging system 701 according to the present embodiment.

In the present embodiment, an example of an imaging system 701 related to an on-vehicle camera will be illustrated. FIG. 17A and FIG. 17B illustrate an example of a vehicle system and an imaging system 701 mounted thereon. An imaging system 701 has imaging devices 702, image preprocessing units 715, an integrated circuit 703, and optical systems 714. Each of the optical systems 714 captures an optical image of a subject on the imaging device 702. Each of the imaging devices 702 converts an optical image of a subject captured by the optical system 714 into an electrical signal. Each of the imaging devices 702 is the imaging device of any of the embodiments described above. Each of the image preprocessing units 715 performs predetermined signal processing on a signal output from the imaging device 702. The function of the image preprocessing unit 715 may be embedded in the imaging device 702. The imaging system 701 is provided with at least two sets of the optical system 714, the imaging device 702, and the image preprocessing unit 715, and output signals from the image preprocessing units 715 of respective sets are input to the integrated circuit 703.

The integrated circuit 703 is an application specific integrated circuit for the imaging system and includes an image processing unit 704 including a memory 705, an optical ranging unit 706, a parallax calculation unit 707, an object recognition unit 708, and an anomaly detection unit 709. The image processing unit 704 performs image processing such as development process, defection correction, or the like on the output signal from the image preprocessing unit 715. The memory 705 stores primary storage of a captured image or a defection position of a captured image. The optical ranging unit 706 performs focusing or ranging of a subject. The parallax calculation unit 707 calculates a parallax (a phase difference of parallax images) from a plurality of image data acquired by the plurality of imaging devices 702. The object recognition unit 708 recognizes a subject such as an automobile, a road, a traffic sign, a person, or the like. In response to detection of an anomaly of the imaging device 702, the anomaly detection unit 709 reports the anomaly to a main control unit 713.

The integrated circuit 703 may be implemented by dedicatedly designed hardware, may be implemented by a software module, or may be implemented by the combination thereof. Further, the integrated circuit 703 may be implemented by a Field Programmable Gate Array (FPGA), an Application Specific Integrated Circuit (ASIC), or the like, or may be implemented by the combination thereof.

The main control unit 713 integrally controls the operation of the imaging system 701, a vehicle sensor 710, a control unit 720, or the like. Note that the embodiment may be configured such that the imaging system 701, the vehicle sensor 710, and the control unit 720 may have separate communication interfaces without the main control unit 713 and transmit and receive control signals, respectively, via the communication network (for example, CAN specification).

The integrated circuit 703 has a function of transmitting a control signal and a setting value to the imaging device 702 in response to receiving the control signal from the main control unit 713 or by using a control unit of the integrated circuit 703. For example, the integrated circuit 703 transmits a setting used for pulse-driving of a switch (a transistor) within the imaging device 702, a setting used for switching a switch for each frame, or the like.

The imaging system 701 is connected to the vehicle sensor 710 and can sense a traveling state of the vehicle, such as a vehicle speed, a yaw rate, a steering angle, or the like, and a state of an environment outside the vehicle or another vehicle and an obstacle. The vehicle sensor 710 also serves as a distance information acquisition unit that acquires information on the distance from the parallax image to the object. Further, the imaging system 701 is connected to a drive support control unit 711 that performs various drive supports such as automatic steering, automatic patrol, collision prevention function, or the like. In particular, with respect to the collision determination function, estimation of a collision and determination of a collision against another vehicle and an obstacle are performed based on the sensing result of the imaging system 701 or the vehicle sensor 710. Thereby, drive support control unit 711 performs avoidance control when a collision is estimated or startup of a safety device at a collision.

Further, the imaging system 701 is connected to an alert device 712 that issues an alert to a driver based on the determination result in a collision determination unit. For example, when the determination result of the collision determination unit indicates a high possibility of collision, the main control unit 713 performs vehicle control to avoid a collision or reduce damage by applying a break, moving back the accelerator pedal, suppressing the engine power, or the like. The alert device 712 performs an alert to a driver by sounding an alert such as a sound, displaying alert information on a display unit screen such as a car navigation system, a meter panel, or the like, providing a vibration to a sheet belt or a steering wheel, or the like.

In the present embodiment, the surrounding area of the vehicle 700, for example, the area in front or rear is captured by the imaging system 701. FIG. 17B illustrates an arrangement example of the imaging system 701 when the area in front of the vehicle is captured by the imaging system 701.

The two imaging devices 702 are arranged in the front of the vehicle 700. Specifically, in terms of acquisition of the distance information or determination of the possibility of collision between the vehicle 700 and the captured object, it is preferable to define the center line with respect to the traveling direction or the external shape (for example, the vehicle width) of the vehicle 700 as a symmetry axis and arrange the two imaging devices 702 in a symmetrical manner with respect to the symmetry axis. Further, it is preferable to arrange the imaging devices 702 so as not to block the driver's field of view when the driver views the status outside the vehicle 700 out of the driver seat. It is preferable to arrange the alert device 712 so as to be easily viewed by the driver.

Next, a failure detection operation of the imaging device 702 in the imaging system 701 will be described by using FIG. 18. The failure detection operation of the imaging device 702 is performed in accordance with steps S810 to S880 illustrated in FIG. 18. Note that, as a setting required for the present failure detection operation, the imaging device 702 has an effective pixel used for capturing (image acquisition pixel) and a failure detection pixel used for failure detection.

Step S810 is a process to perform a setting when the imaging device 702 is started up. That is, a capture operation and a failure detection operation of the imaging device 702 are started when a setting used for the operation of the imaging device 702 is transmitted to the imaging device 702 by a device outside the imaging system 701 (for example, the main control unit 713) or inside the imaging system 701.

Next, in step S820, the imaging device 702 acquires a pixel signal from an effective pixel. Further, in step S830, the imaging device 702 acquires an output value from a failure detection pixel provided for failure detection. This failure detection pixel has a photoelectric conversion unit in the same manner as an effective pixel. A predetermined voltage is written to this photoelectric conversion unit. The failure detection pixel outputs a signal corresponding to this voltage written to the photoelectric conversion unit. Note that the order of step S820 and step S830 may be opposite.

Next, in step S840, the imaging device 702 performs classification to determine matching or non-matching between an output expectation value of a failure detection pixel and an output value from an actual failure detection pixel.

If the output expectation value and the actual output value are matched as a result of the classification in step S840, the process proceeds to step S850. In step S850, the imaging device 702 determines that the capture operation is normally performed, and the process proceeds to step S860. In step S860, the imaging device 702 transmits a pixel signal of a scanned row to the memory 705. The memory 705 temporarily stores the pixel signal of the scanned row. The process then returns to step S820 and continues the failure detection operation.

On the other hand, if the output expectation value and the actual output value are not matched as a result of the classification in step S840, the process proceeds to step S870. In step S870, the imaging device 702 determines that the capture operation has an anomaly and reports an alert to the main control unit 713 or the alert device 712. The alert device 712 notifies the driver that an anomaly has been detected. Then, in step S880, the imaging device 702 stops, and the operation of the imaging system 701 ends.

Note that, while the example in which the failure detection process from step S820 to step S860 is looped for each readout on one row has been illustrated in the present embodiment, the cycle of the failure detection process is not limited to this example. For example, the failure detection process may be performed for each readout on multiple rows, or the failure detection operation may be performed on a frame basis.

Note that an entity to which an alert is reported by the alert device 712 in step S870 may be an entity outside the vehicle 700. In such a case, a signal used for the alert may be transmitted to the outside of the vehicle 700 via a wireless network.

Further, although control for avoiding a collision to another vehicle has been described in the present embodiment, the embodiment is also applicable to automatic driving control for following another vehicle, automatic driving control for not going out of a traffic lane, or the like. Furthermore, the imaging system 701 is not limited to a vehicle and can be applied to a mobile apparatus (moving apparatus) such as a ship, an airplane, or an industrial robot, for example. In addition, the imaging system can be widely applied to a device which utilizes object recognition, such as an intelligent transportation system (ITS), without being limited to mobile apparatuses.

Modified Embodiment

The present invention is not limited to the embodiments described above, and various modifications are possible. For example, a configuration in which a part of the configuration of any of the embodiments is added to another embodiment or a configuration in which a part of the configuration of any of the embodiments is replaced with a part of the configuration of another embodiment is one of the embodiments of the present invention.

In the embodiments described above, the ramp signal VRMP is illustrated as an example of a reference signal input to the comparator 51. However, a reference signal that may be used is not limited to the above, and a reference signal input to the comparator 51 may be a reference signal used for successive comparison type AD conversion, for example.

Further, in the embodiments described above, the operation of the imaging device is assumed to be a rolling shutter operation in which the start time and the end time of a charge accumulation period in pixels are different for respective rows of the pixels. However, the operation of the imaging device is not limited to the above but may be a global shutter operation in which the start time and the end time of a charge accumulation period are the same among a plurality of rows and a plurality of columns.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-153929, filed Aug. 20, 2018, which is hereby incorporated by reference herein in its entirety.

What is claimed is:

1. An analog-to-digital (AD) conversion device comprising:
   a comparator configured to compare an input analog signal and a reference signal;
   a plurality of first bit-memories configured to hold a digital signal including a plurality of bits generated based on a result of comparison performed by the comparator, each of the plurality of first bit-memories holding a bit signal of a corresponding one bit among the plurality of bits of the digital signal;
   an output circuit to which the bit signal output from each of the plurality of first bit-memories is commonly input;
   a transmission line configured to transmit the bit signal output from the output circuit; and
   a first scanning circuit configured to sequentially select, from the plurality of first bit-memories, a first bit-memory that outputs the bit signal to the output circuit so that bit signals of one digital signal sequentially output from the plurality of first bit-memories to the output circuit.

2. The AD conversion device according to claim 1 further comprising:
   an input circuit to which the bit signal output from each of the plurality of first bit-memories is commonly input via the transmission line;
   a plurality of second hit-memories configured to hold the bit signals, in response to receiving the bit signals sequentially output from the input circuit; and
   a second scanning circuit configured to sequentially select, from the plurality of second hit-memories, a second hit-memory which receives the bit signal output from the input circuit.

3. The AD conversion device according to claim 2, wherein the number of the plurality of second bit-memories to which the input circuit outputs the bit signal is larger than or equal to the number of the plurality of first bit-memories which commonly input the bit signal to the output circuit.

4. The AD conversion device according to claim 3, wherein the number of the plurality of second bit-memories to which the input circuit outputs the bit signal is a multiple of the number of the plurality of first bit-memories which commonly input the bit signal to the output circuit.

5. The AD conversion device according to claim 1 further comprising a first AD conversion unit and a second AD conversion unit each having the comparator and the plurality of first bit-memories,
   wherein arrangement of the comparator and the plurality of first bit-memories in the first AD conversion unit and arrangement of the comparator and the plurality of first bit-memories in the second AD conversion unit are symmetrical.

6. The AD conversion device according to claim 1, wherein a first mode in which the digital signal is held by using a first number of first bit-memories out of the plurality of first bit-memories and a second mode in which the digital signal is held by using a second number of first bit-memories out of the plurality of first bit-memories are switchable, the second number being smaller than the first number.

7. The AD conversion device according to claim 6, wherein switching between the first mode and the second mode is performed by changing the number of first bit-memories selected by the first scanning circuit.

8. The AD conversion device according to claim 1 further comprising a plurality of memory regions each having the plurality of first bit-memories, wherein a first mode in which the digital signal is held by using the plurality of first bit-memories included in a first number of memory regions and a second mode in which the digital signal is held by using the plurality of first bit-memories included in a second number of memory regions are switchable, the second number being smaller than the first number.

9. The AD conversion device according to claim 8, wherein switching between the first mode and the second mode is performed by changing the number of memory regions selected by the first scanning circuit.

10. The AD conversion device according to claim 1 further comprising a counter configured to generate a count signal whose value changes with time,
wherein the reference signal is a ramp signal whose potential monotonically increases or monotonically decreases with time, and
wherein the plurality of first bit-memories hold, as the bit signal, a count signal in accordance with a timing when a level of an output signal of the comparator changes.

11. The AD conversion device according to claim 1 further comprising a first AD conversion unit and a second AD conversion unit each having the comparator, the plurality of first bit-memories, the output circuit, and the transmission line.

12. An imaging device comprising:
a photoelectric conversion unit configured to generate charges in accordance with an incident light; and
the AD conversion device according to claim 1 to which an analog signal based on the charges is input.

13. The imaging device according to claim 12 comprising a first chip and a second chip stacked each other,
wherein the photoelectric conversion unit is arranged in the first chip, and
wherein the plurality of first bit-memories are arranged in the second chip.

14. The imaging device according to claim 13,
wherein the comparator includes a plurality of transistors,
wherein some of the plurality of transistors are arranged in the first chip, and
wherein other of the plurality of transistors are arranged in the second chip.

15. The imaging device according to claim 12 comprising a first chip, a second chip, and a third chip stacked each other,
wherein the photoelectric conversion unit is arranged in the first chip,
wherein the comparator is arranged in the second chip, and
wherein the plurality of first bit-memories are arranged in the third chip.

16. The imaging device according to claim 12 further comprising a floating diffusion region to which charges generated by the photoelectric conversion unit are transferred,
wherein the comparator has an input transistor, and
wherein a gate of the input transistor is connected to the floating diffusion region.

17. An imaging system comprising:
the imaging device according to claim 12; and
a signal processing unit configured to process a signal output from the imaging device.

18. A mobile apparatus comprising:
the imaging device according to claim 12; and
a control unit configured to control the mobile apparatus based on a signal output from the imaging device.

19. An analog-to-digital (AD) conversion device comprising:
a comparator configured to compare art input analog signal and a reference signal;
a plurality of first bit-memories configured to hold a digital signal including a plurality of bits generated based on a result of comparison performed by the comparator, each of the plurality of first bit-memories holding a bit signal of a corresponding one bit among the plurality of bits of the digital signal;
a transmission line configured to transmit the bit signal output from each of the plurality of first bit-memories;
a first scanning circuit configured to sequentially select, from the plurality of first bit-memories, a first bit-memory which outputs the bit signal;
an input circuit to which the bit signal output from each of the plurality of first hit-memories is commonly input via the transmission line;
a plurality of second hit-memories configured to hold the bit signals respectively, in response to receiving the bit signals sequentially output from the input circuit; and
a second scanning circuit configured to sequentially select, from the plurality of second bit-memories, a second bit-memory that receives the bit signal output from the input circuit.

20. The AD conversion device according to claim 19 further comprising a first AD conversion unit and a second AD conversion unit each having the comparator, the plurality of first bit-memories, the plurality of second bit-memories, and the input circuit.

* * * * *